US012450900B2

(12) United States Patent
Kuroda

(10) Patent No.: US 12,450,900 B2
(45) Date of Patent: Oct. 21, 2025

(54) INFORMATION PROCESSING DEVICE AND METHOD FOR SCENE ESTIMATION AND CHUNK ESTIMATION

(71) Applicant: INFORMATION SYSTEM ENGINEERING INC., Tokyo (JP)

(72) Inventor: Satoshi Kuroda, Tokyo (JP)

(73) Assignee: INFORMATION SYSTEM ENGINEERING INC., Tokyo (JP)

( * ) Notice: Subject to any disclaimer, the term of this patent is extended or adjusted under 35 U.S.C. 154(b) by 84 days.

(21) Appl. No.: 17/417,987

(22) PCT Filed: Mar. 12, 2021

(86) PCT No.: PCT/JP2021/010015
§ 371 (c)(1),
(2) Date: Jun. 24, 2021

(87) PCT Pub. No.: WO2021/193136
PCT Pub. Date: Sep. 30, 2021

(65) Prior Publication Data
US 2022/0335717 A1    Oct. 20, 2022

(30) Foreign Application Priority Data

Mar. 26, 2020  (JP) .............................. 2020-056425
Aug. 18, 2020  (JP) .............................. 2020-137952

(51) Int. Cl.
*G06V 20/00*   (2022.01)
*G06F 16/907*  (2019.01)
(Continued)

(52) U.S. Cl.
CPC ............ *G06V 20/35* (2022.01); *G06F 16/907* (2019.01); *G06N 3/045* (2023.01); *G06N 20/00* (2019.01);
(Continued)

(58) Field of Classification Search
CPC ........ G06V 20/35; G06V 20/50; G06V 20/60; G06V 20/63; G06V 20/70; G06V 20/80;
(Continued)

(56) References Cited

U.S. PATENT DOCUMENTS 5,778,381 A    7/1998  Sandifer
7,039,625 B2   5/2006  Kim et al.
(Continued)

FOREIGN PATENT DOCUMENTS

CA    3021720 A1    4/2019
CN    1532621 A     9/2004
(Continued)

OTHER PUBLICATIONS

Notice of Allowance dated Jan. 14, 2022, issued in related U.S. Appl. No. 16/604,079.
(Continued)

*Primary Examiner* — Vincent Rudolph
*Assistant Examiner* — Timothy Choi
(74) *Attorney, Agent, or Firm* — Holtz, Holtz & Volek PC

(57) ABSTRACT

An information processing device to output work information, which is information related to work performed by a user, has a scene estimation unit to acquire a first image, location information, and time information, all relating to the work, and to estimate a scene by using a first trained model, a chunk estimation unit to acquire a second image, of equipment related to the work, and estimate a chunk by using one of a plurality of second trained models, in which associations among the second image, a chunk ID that uniquely identifies the chunk, which is information that divides or suggests the work information, and one or a plurality of chunk-meta IDs that are associated on a one-to-one basis, are stored, and an output unit to output the chunk.

4 Claims, 11 Drawing Sheets

(51) Int. Cl.
  *G06F 18/21*  (2023.01)
  *G06N 3/045*  (2023.01)
  *G06N 3/08*  (2023.01)
  *G06N 20/00*  (2019.01)
  *G06Q 10/0633*  (2023.01)
  *G06V 10/70*  (2022.01)

(52) U.S. Cl.
  CPC ......... *G06Q 10/0633* (2013.01); *G06V 10/87* (2022.01); *G06F 18/21* (2023.01); *G06N 3/08* (2013.01); *G06V 2201/10* (2022.01)

(58) Field of Classification Search
  CPC .. G06V 10/803; G06V 10/87; G06V 2201/10; G06N 3/045; G06F 16/907; G06F 16/908; G06F 16/909; G06F 18/21
  See application file for complete search history.

(56) References Cited

U.S. PATENT DOCUMENTS

| | | | |
|---|---|---|---|
| 8,196,212 | B2 | 6/2012 | Tsusaka et al. |
| 8,442,268 | B2 | 5/2013 | Isogai et al. |
| 8,732,025 | B2 | 5/2014 | Gokturk et al. |
| 8,799,401 | B1 | 8/2014 | Bryar et al. |
| 9,064,326 | B1 * | 6/2015 | Loxam ................ G06V 20/20 |
| 9,164,506 | B1 | 10/2015 | Zang |
| 10,140,421 | B1 | 11/2018 | Bernard et al. |
| 10,192,087 | B2 | 1/2019 | Davis et al. |
| 10,438,050 | B2 | 10/2019 | Watanabe et al. |
| 10,643,073 | B2 | 5/2020 | Sugaya |
| 10,878,283 | B2 | 12/2020 | Kurita et al. |
| 10,885,618 | B2 | 1/2021 | Hanzawa et al. |
| 11,222,081 | B2 | 1/2022 | Whigham et al. |
| 11,520,822 | B2 * | 12/2022 | Kuroda ............ G06F 16/7867 |
| 2003/0126129 | A1 | 7/2003 | Watson |
| 2004/0183918 | A1 | 9/2004 | Squilla et al. |
| 2004/0230564 | A1 | 11/2004 | Simon et al. |
| 2004/0260694 | A1 | 12/2004 | Chaudhuri et al. |
| 2005/0171661 | A1 | 8/2005 | Abdel-Malek et al. |
| 2006/0123000 | A1 | 6/2006 | Baxter et al. |
| 2006/0136362 | A1 | 6/2006 | Jones et al. |
| 2006/0156220 | A1 | 7/2006 | Dreystadt et al. |
| 2006/0161313 | A1 | 7/2006 | Rogers et al. |
| 2006/0287993 | A1 | 12/2006 | Yao et al. |
| 2007/0188626 | A1 | 8/2007 | Squilla et al. |
| 2008/0028362 | A1 | 1/2008 | Ugai et al. |
| 2008/0120282 | A1 | 5/2008 | Liberty et al. |
| 2009/0265313 | A1 | 10/2009 | Wang |
| 2010/0023554 | A1 | 1/2010 | Fujimoto et al. |
| 2011/0093449 | A1 | 4/2011 | Belenzon et al. |
| 2011/0222832 | A1 | 9/2011 | Aizawa |
| 2011/0238668 | A1 | 9/2011 | Matsumoto |
| 2011/0243453 | A1 | 10/2011 | Kashima et al. |
| 2011/0246881 | A1 | 10/2011 | Kushman et al. |
| 2012/0057032 | A1 * | 3/2012 | Jang ................ G06T 19/006 348/207.1 |
| 2012/0075343 | A1 | 3/2012 | Chen et al. |
| 2012/0086792 | A1 | 4/2012 | Akbarzadeh et al. |
| 2012/0209470 | A1 | 8/2012 | Gilbert et al. |
| 2013/0010068 | A1 | 1/2013 | Tiernan et al. |
| 2013/0138696 | A1 | 5/2013 | Turdakov et al. |
| 2013/0215264 | A1 | 8/2013 | Soatto et al. |
| 2013/0266228 | A1 | 10/2013 | Markson et al. |
| 2014/0009476 | A1 | 1/2014 | Venkitaraman et al. |
| 2014/0061304 | A1 | 3/2014 | Drees et al. |
| 2014/0111542 | A1 | 4/2014 | Wan |
| 2014/0320677 | A1 | 10/2014 | Jarvenpaa et al. |
| 2014/0355879 | A1 | 12/2014 | Agosta et al. |
| 2015/0253977 | A1 | 9/2015 | Kang |
| 2016/0019212 | A1 | 1/2016 | Soldani |
| 2016/0026900 | A1 | 1/2016 | Ando |
| 2016/0049010 | A1 | 2/2016 | Hinski |
| 2016/0162748 | A1 | 6/2016 | Bastide et al. |
| 2016/0287987 | A1 | 10/2016 | Onda et al. |
| 2016/0342681 | A1 | 11/2016 | Kesin |
| 2016/0378939 | A1 | 12/2016 | Baumberger et al. |
| 2017/0124447 | A1 | 5/2017 | Chang et al. |
| 2017/0193575 | A1 | 7/2017 | King et al. |
| 2017/0344958 | A1 | 11/2017 | Lumera et al. |
| 2018/0101791 | A1 | 4/2018 | Viswanathan |
| 2018/0105186 | A1 | 4/2018 | Motomura et al. |
| 2018/0150598 | A1 | 5/2018 | Kohls et al. |
| 2018/0204083 | A1 * | 7/2018 | Goyal ................ G06F 18/22 |
| 2018/0330818 | A1 | 11/2018 | Hsieh et al. |
| 2018/0342050 | A1 | 11/2018 | Fitzgerald et al. |
| 2018/0342060 | A1 | 11/2018 | Yao et al. |
| 2018/0374105 | A1 * | 12/2018 | Azout ................ G06N 3/08 |
| 2019/0019166 | A1 | 1/2019 | Vahid |
| 2019/0045158 | A1 | 2/2019 | Osanai et al. |
| 2019/0108411 | A1 | 4/2019 | Liu et al. |
| 2019/0110856 | A1 | 4/2019 | Barral et al. |
| 2019/0122269 | A1 | 4/2019 | Pugazhendhi et al. |
| 2019/0163975 | A1 | 5/2019 | Desai et al. |
| 2019/0171886 | A1 | 6/2019 | Ashour et al. |
| 2019/0236489 | A1 | 8/2019 | Koudal et al. |
| 2019/0262084 | A1 | 8/2019 | Roh et al. |
| 2019/0278992 | A1 | 9/2019 | Hossain et al. |
| 2019/0286942 | A1 | 9/2019 | Abhiram et al. |
| 2019/0287197 | A1 | 9/2019 | Chang et al. |
| 2019/0325299 | A1 | 10/2019 | Oliveira Pinheiro |
| 2019/0333633 | A1 * | 10/2019 | Sugaya ................ G16H 40/40 |
| 2019/0362243 | A1 | 11/2019 | Matsumura |
| 2020/0019780 | A1 | 1/2020 | Sugaya |
| 2020/0026257 | A1 | 1/2020 | Dalal et al. |
| 2020/0034782 | A1 | 1/2020 | Hsieh et al. |
| 2020/0058001 | A1 | 2/2020 | Naritake et al. |
| 2020/0105067 | A1 | 4/2020 | Sutter et al. |
| 2020/0193206 | A1 * | 6/2020 | Turkelson ............ G06F 18/214 |
| 2020/0210850 | A1 | 7/2020 | Nuthi et al. |
| 2020/0210966 | A1 | 7/2020 | Nuthi et al. |
| 2020/0258276 | A1 * | 8/2020 | Ayush ................ G06T 7/70 |
| 2020/0293825 | A1 | 9/2020 | Ji et al. |
| 2021/0089824 | A1 | 3/2021 | Ge et al. |
| 2021/0157841 | A1 * | 5/2021 | Kuroda ............ G06F 16/9035 |
| 2021/0365685 | A1 | 11/2021 | Shah et al. |
| 2022/0020482 | A1 | 1/2022 | Sreenivasan et al. |
| 2022/0245558 | A1 * | 8/2022 | Kuroda ................ G09B 19/00 |
| 2023/0033090 | A1 * | 2/2023 | Kuroda ................ G06V 10/75 |

FOREIGN PATENT DOCUMENTS

| | | |
|---|---|---|
| CN | 101315652 A | 12/2008 |
| CN | 101855633 A | 10/2010 |
| CN | 105027162 A | 11/2015 |
| CN | 106920071 A | 7/2017 |
| CN | 107403194 A | 11/2017 |
| CN | 107531244 A | 1/2018 |
| CN | 109767418 A | 5/2019 |
| CN | 109782902 A | 5/2019 |
| CN | 109961421 A | 7/2019 |
| CN | 110135449 A | 8/2019 |
| CN | 113168906 A | 7/2021 |
| EP | 2775408 A1 | 9/2014 |
| JP | 2005196540 A | 7/2005 |
| JP | 2006309486 A | 11/2006 |
| JP | 2010003190 A | 1/2010 |
| JP | 2011090348 A | 5/2011 |
| JP | 2011170690 A | 9/2011 |
| JP | 2014085730 A | 5/2014 |
| JP | 2014224877 A | 12/2014 |
| JP | 2014238680 A | 12/2014 |
| JP | 2015106862 A | 6/2015 |
| JP | 2017224133 A | 12/2017 |
| JP | 6267841 B1 | 1/2018 |
| JP | 2018049421 A | 3/2018 |
| JP | 6321879 B1 | 5/2018 |
| JP | 2018092227 A | 6/2018 |
| JP | 2018097437 A | 6/2018 |
| JP | 2018097580 A | 6/2018 |
| JP | 2018101353 A | 6/2018 |
| JP | 2018194949 A | 12/2018 |
| JP | 2018206085 A | 12/2018 |
| JP | 2018206341 A | 12/2018 |

(56) References Cited

FOREIGN PATENT DOCUMENTS

| | | |
|---|---|---|
| JP | 2019021150 A | 2/2019 |
| JP | 2019032593 A | 2/2019 |
| JP | 2019109844 A | 7/2019 |
| JP | 6651190 B1 | 2/2020 |
| KR | 102419018 B1 | 7/2022 |
| WO | 2011105671 A1 | 9/2011 |
| WO | 2017169907 A1 | 10/2017 |
| WO | 2017216929 A1 | 12/2017 |
| WO | 2018100878 A1 | 6/2018 |

OTHER PUBLICATIONS

International Search Report (ISR) (and its English language translation) and Written Opinion dated Apr. 28, 2020 Issued in International Application No. PCT/JP2020/013358.
International Search Report (ISR) (and its English language translation) and Written Opinion dated Apr. 7, 2020 issued In International Application No. PCT/JP2020/005544.
International Search Report (ISR) (and its English language translation) and Written Opinion dated Apr. 7, 2020 issued In International Application No. PCT/JP2020/005545.
International Search Report (ISR) (and its English language translation) and Written Opinion dated Aug. 13, 2019 Issued in International Application No. PCT/JP2019/028626.
International Search Report (ISR) (and its English language translation) and Written Opinion dated Jun. 16, 2020 Issued in International Application No. PCT/JP2020/013357.
International Search Report (ISR) (and its English language translation) and Written Opinion dated Jun. 16, 2020 Issued in International Application No. PCT/JP2020/013352.
International Search Report (ISR) and Written Opinion dated May 18, 2021 issued in International Application No. PCT/JP2021/010015.
International Search Report (ISR) (and its English language translation) and Written Opinion dated Oct. 27, 2020 Issued in International Application No. PCT/JP2020/029033.
U.S. Appl. No. 16/972,273; First Named Inventor: Satoshi Kuroda; Title: "Information Providing System"; filed Dec. 4, 2020.
U.S. Appl. No. 17/029,980; First Named Inventor: Satoshi Kuroda; Title: "Information Providing System"; filed Sep. 23, 2020.
U.S. Appl. No. 16/962,055; First Named Inventor: Satoshi Kuroda; Title: "Learning Method and Information Providing System"; filed Jul. 14, 2020.
U.S. Appl. No. 16/962,085; First Named Inventor: Satoshi Kuroda; Title: "Information Providing System"; filed Jul. 14, 2020.
U.S. Appl. No. 16/962,113; First Named Inventor: Satoshi Kuroda; Title: "Learning Method and Information Providing System"; filed Jul. 14, 2020.
U.S. Appl. No. 16/604,079; First Named Inventor: Satoshi Kuroda; Title: "Information Service System and Information Service Method"; filed Oct. 9, 2019.
U.S. Appl. No. 16/765,130; First Named Inventor: Satoshi Kuroda; Title: "Information Providing System and Information Providing Method"; filed May 18, 2020.
U.S. Appl. No. 16/765, 139; First Named Inventor: Satoshi Kuroda; Title: "Information Providing System and Information Providing Method"; filed May 18, 2020.
Office Action (Non-Final Rejection) dated Mar. 2, 2022 issued in related U.S. Appl. No. 16/962,085.
Office Action (Final Rejection) dated Sep. 20, 2022, issued in related U.S. Appl. No. 17/029,980.
Office Action (Non-Final Rejection) dated Feb. 23, 2022, issued in U.S. Appl. No. 17/029,980.
Office Action (Non-Final Rejection) dated Mar. 28, 2022, issued in related U.S. Appl. No. 17/029,980.
Office Action (Non-Final Rejection) dated Mar. 31, 2022, issued in related U.S. Appl. No. 16/765,130.
Lu., et al., "Exploratory Product Image Search With Circle-to-Search Interaction", in IEEE Transactions on Circuits and Systems for Video Technology, vol. 25, No. 7, pp. 1190-1202, Jul. 2015, doi: 10.1109/TCSVT.2014.2372272. (Year: 2015).
Chinese Office Action (and English language translation thereof) dated Jun. 21, 2021, issued in Chinese Application No. 201980003667.8 (which is a Chinese counterpart of related U.S. Appl. No. 16/604,079).
Office Action (Non-Final Rejection) dated Apr. 13, 20212, issued in related U.S. Appl. No. 16/765,139.
Office Action (Final Rejection) dated Aug. 10, 2022, issued in related U.S. Appl. No. 16/962,085.
Office Action (Non-Final Rejection) dated Mar. 29, 2023, issued in related U.S. Appl. No. 16/972,273.
Lueddemann, et al., "Dynamic generation of technical documentation for medical devices", IEEE International Conference on Robotics and Biomimetics (ROBIO 2014), Bali, Indonesia, doi: 10.1109/ROBIO.2014.7090637, 2014, pp. 2043-2048.
Notice of Allowance dated Dec. 29, 2022, issued in related U.S. Appl. No. 16/962,085.
Office Action (Non-Final Rejection) dated Aug. 11, 2023, issued in related U.S. Appl. No. 16/962,113.
Waddell, "A High-Tech Future; Windsor manufacturing well-positioned to benefit from innovation", The Windsor Star, Retrieved from https://dialog.proquest.com/professional/docview/1 958571 404?accountid=1 31444.
Chinese Office Action dated Jul. 28, 2021, issued in counterpart Chinese Application No. 202180001969.9.
Office Action (Non-Final Rejection) dated Jul. 24, 2023, issued in related U.S. Appl. No. 16/962,055.
Notice of Allowance dated Nov. 22, 2023, issued in related U.S. Appl. No. 17/029,980.
Chinese Office Action dated Dec. 28, 2023, issued in Chinese Application No. 202080005900.9 (which is a counterpart of related U.S. Appl. No. 16/972,273).
Chinese Office Action dated Nov. 29, 2023, issued in Chinese Application No. 202080002662.6 (which is a counterpart of related U.S. Appl. No. 16/962,055).
Office Action (Non-Final Rejection) dated Dec. 4, 2024, issued in related U.S. Appl. No. 16/962,055.
Office Action (Final Rejection) dated Jun. 26, 2025, issued in related U.S. Appl. No. 16/962,055.

\* cited by examiner

FIG. 5

SCENE TB (TB1)

| SCENE ID | SCENE NAME |
|---|---|
| OFD | OPERATING ROOM |
| OFE | TREATMENT ROOM |
| ... | |

MODEL TB (TB2)

| MODEL ID | SCENE ID |
|---|---|
| MD1 | OFD |
| MD2 | OFE |
| ... | |

CONTENT TB (TB3)

| CONTENT ID | CONTENTS |
|---|---|
| 1B827-01 | 1B827-01.txt |
| 1B828-02 | 1B828-02.mov |
| 1B829-05 | 1B829-02_1.pdf |
| ... | |

SCENE/CONTENT TB (TB4)

| SCENE ID | CONTENT ID |
|---|---|
| OFD | 1B827-01 |
| | 1B828-02 |
| | 1B829-05 |
| | ... |
| OFE | 1B840-01 |
| | 1B845-01 |
| | 1B850-03 |
| | ... |
| ... | |

CONTENT/CHUNK TB (TB5)

| CONTENT ID | CHUNK ID |
|---|---|
| 1B827-01 | 82700-01 |
| 1B828-02 | 82800-02 |
| 1B829-05 | 82901-01 |
| | 82902-01 |
| | 82903-05 |
| | ... |

CHUNK/META TB (TB6)

| CHUNK ID | CHUNK-META ID |
|---|---|
| 82700-01 | 24FD |
| | 83D9 |
| 82800-02 | 25FD |
| | 84D9 |
| 82901-01 | 54BB |
| | 25FD |
| ... | |

CHUNK TB (TB7)

| CHUNK ID | CHUNK | CHUNK SUMMARY | HASH VALUE |
|---|---|---|---|
| 82700-01 | 1B827-01.txt_0 | DUE TO DETERIORATION OVER TIME, ... | 564544d8f0b746e |
| 82800-02 | 1B828-02.mov_0 | [MOVIE] 3:08 | 4d8f0b746e56454 |
| 1B829-05 | 1B829-02_1.pdf_1 | STEP 1: FOR MOVE ... | ef984e9e1e20e16 |
| ... | | | |

CHUNK-META TB (TB8)

| CHUNK-META ID | CHUNK-CATEGORY ID | CHUNK-CATEGORY NAME | CHUNK-META VALUE |
|---|---|---|---|
| 24FD | 394 | WEIGHT | LIGHT |
| 25FD | 394 | WEIGHT | HEAVY |
| 83D9 | 025 | COLOR | WHITE |
| 84D9 | 025 | COLOR | BLUE |
| 53BB | 120 | SHAPE | ANGULAR |
| 54BB | 120 | SHAPE | ROUND |
| ... | | | |

INFORMATION PROCESSING DEVICE AND METHOD FOR SCENE ESTIMATION AND CHUNK ESTIMATION

TECHNICAL FIELD

The present invention relates to an information processing device, an information processing method and a data structure.

BACKGROUND ART

For example, the work support system of patent literature 1 generates rules that describe the conditions for judging the target of work or the situation of work, based on a manual that describes the work procedures, its detail, points to be noted, and/or other matters, identifies the target of work and the situation of work based on sensor information acquired from equipment that is attached to the user, and outputs work support information based on the generated rules and the results of identification by the identifying means.

CITATION LIST

Patent Literature

Patent Literature 1: Japanese Unexamined Patent Application Publication No. 2019-109844

SUMMARY OF INVENTION

Problem to be Solved by the Invention

However, with the technique described in patent literature 1, the information accumulated in the form of documents such as manuals can be searched only per document. For example, when searching documents in units of paragraphs, it is necessary to reconstruct the documents into structured information. Considering the cost effectiveness, reconstructing all the documents to be searched is often not realistic, and, if information is provided only in document units, a lot of unnecessary information has to be viewed, and there is a problem that the viewer of the documents may be unable to make quick responses.

It is therefore an object of one aspect of an embodiment of the present invention to provide an information processing device that presents information to the user when needed by the user, in the amount needed by the user, without reconstructing information on a large scale.

Means for Solving the Problems

An information processing device to output work information, which is information related to work performed by a user, has a scene estimation unit to acquire a first image, which is an image of a scene of a workplace where the user performs the work, location information, which is information about the location where the user is, and time information, which is information about the time the user performs the work, and estimate the scene by using a first trained model, in which an association between information related to the first image and information related to a scene ID that uniquely identifies the scene is stored, a chunk estimation unit to acquire a second image, which is an image of equipment related to the work, and estimate a chunk by using one of a plurality of second trained models, in which associations among the second image, a chunk ID that uniquely identifies the chunk, which is information that divides or suggests the work information, and one or a plurality of chunk-meta IDs that are associated on a one-to-one basis, are stored, and an output unit to output the chunk, in which the chunk estimation unit selects one of the plurality of second trained models using a model ID associated with a scene ID on a one-to-one basis, and in which the chunk-meta ID uniquely identifies a chunk-meta value, which is information related to the property of the equipment.

An information processing method for outputting work information, which is information related to work performed by a user, includes a first step of acquiring a first image, which is an image of a scene of a workplace where the user performs the work, location information, which is information about a location where the user is, and time information, which is information about a time the user performs the work, and estimating the scene by using a first trained model, in which an association between information related to the first image and information related to a scene ID that uniquely identifies the scene is stored, a second step of acquiring a second image, which is an image of equipment related to the work, and estimating a chunk by using one of a plurality of second trained models, in which associations among the second image, a chunk ID that uniquely identifies the chunk, which is information that divides or suggests the work information, and one or a plurality of chunk-meta IDs that are associated on a one-to-one basis, are stored, and a third step of outputting the chunk, in which the chunk estimation unit selects one of the plurality of second trained models using a model ID associated with a scene ID on a one-to-one basis, and in which the chunk-meta ID uniquely identifies a chunk-meta value, which is information related to a property of the equipment.

Advantageous Effects of Invention

According to one aspect of an embodiment of the present invention, it is possible to realize an information processing device that presents information to the user when needed by the user, in the amount needed by the user, without reconstructing information on a large scale.

BRIEF DESCRIPTION OF DRAWINGS

FIG. 5 is a diagram to show the information that is stored in the auxiliary storage device according to the present embodiment;

DESCRIPTION OF EMBODIMENTS

Hereinafter, one aspect of an embodiment of the present invention will be described in detail below, with reference to the accompanying drawings. For example, the information which the worker responsible for the maintenance of equipment in medical and nursing care environments will be described below.

Embodiment

Figure 1:
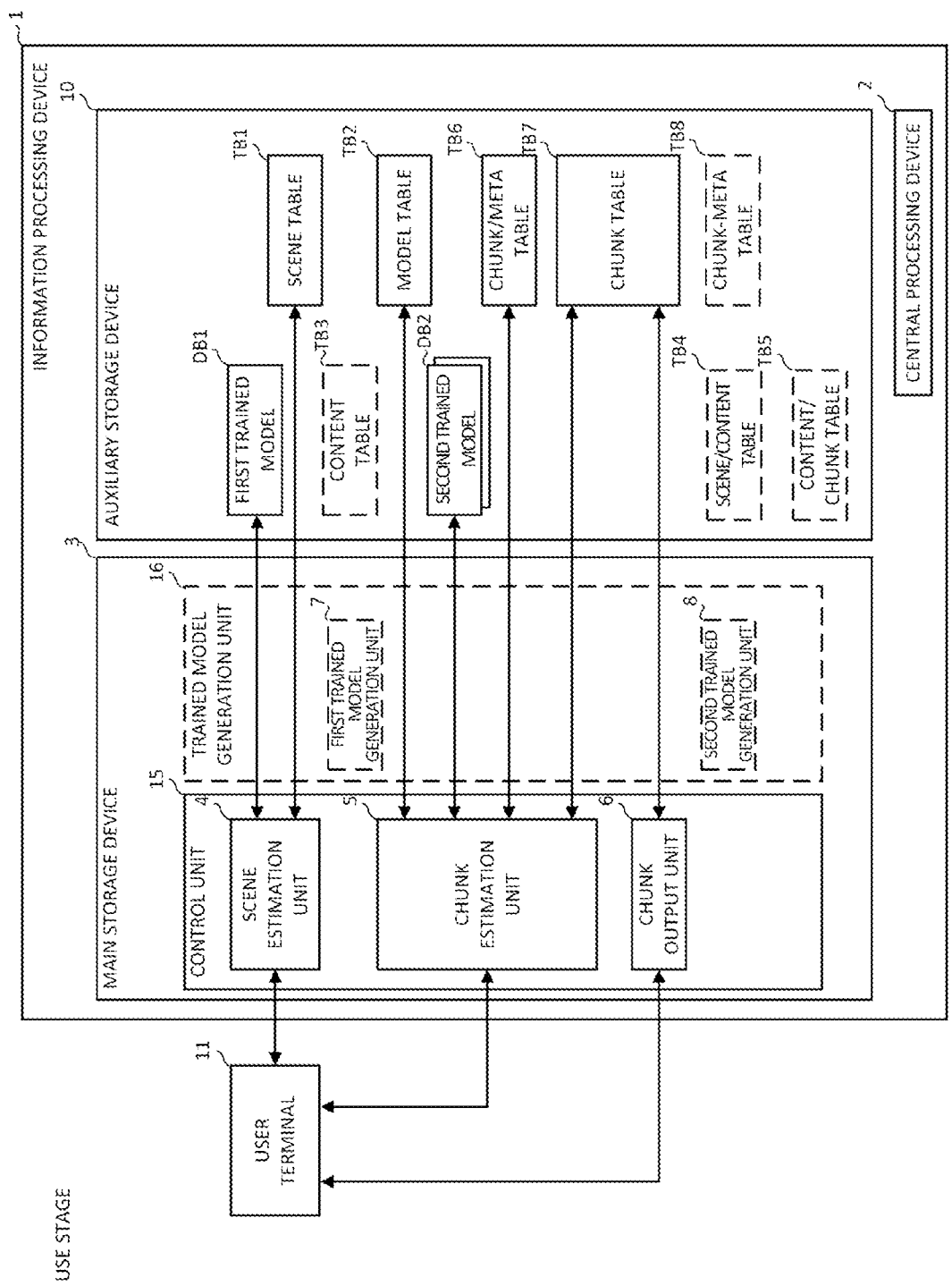
FIG. 1 is a block diagram to show a configuration of the information processing device in the use stage according to the present embodiment.

First, an information processing device 1 in the use stage will be described with reference to FIG. 1. FIG. 1 is a block diagram to show a configuration of the information processing device 1 in the use stage according to the present embodiment. The information processing device 1 has a central processing device 2, a main storage device 3, and an auxiliary storage device 10.

The central processing device 2 is, for example, a CPU (Central Processing Unit), and executes processes by invoking programs stored in the main storage device 3. The main storage device 3 is, for example, a RAM (Random Access Memory), and stores programs of a scene estimation unit 4, a chunk estimation unit 5, a chunk output unit 6, a first trained model generation unit 7 and a second trained model generation unit 8 (described later).

Note that the program covering the scene estimation unit 4, the chunk estimation unit 5 and the chunk output unit 6 may be referred to as a "control unit 15." The program covering the first trained model generation unit 7 and the second trained model generation unit 8 may be referred to as a "trained model generation unit 16."

The auxiliary storage device 10 is, for example, an SSD (Solid State Drive) or an HDD (Hard Disk Drive), stores databases such as a first trained model DB 1, a first training model DB 1', a second trained model DB 2, and a second training model DB 2', and tables such as a scene table TB 1, a model table TB 2, a content table TB 3, a scene/content table TB 4, a content/chunk table TB 5, a chunk/meta table TB 6, a chunk table TB 7, and a chunk-meta table TB 8, which will be described later.

As shown in FIG. 1, the information processing device 1 that outputs work information, which is information related to the work performed by the user, has a scene estimation unit 4 that estimates the scene, which is the place for work where the user performs work, in the use stage, a chunk estimation unit 5 that estimates the chunk, and a chunk output unit 6 that outputs the chunk, which is information that divides or suggests the work information. Here, the work information may be referred to as "contents", and content IDs are provided to identify the work information uniquely.

The scene estimation unit 4 acquires the first image 20 (25) (described later), which is an image of a scene, location information, which is information about the location where the user is, and time information, which is information about the time the user performs the work, and, using the first trained model DB 1, in which associations between information related to the first image 20 (25) and information related to scene IDs that identify scenes uniquely, are stored, estimates the scene.

The chunk estimation unit 5 acquires a second image 30 (35) (described later), which is an image of the equipment 22 (23) related to the work (described later), and, using one of a plurality of second trained models DB 2, in which associations between the second image 30 (35) and one or a plurality of chunk-meta IDs are stored, where the chunk-meta IDs are associated, on a one-to-one basis, with chunk IDs that identify chunks uniquely, and where the chunks are information that divides or suggests the work information, estimates the chunk.

The chunk estimation unit 5 selects one of the plurality of second trained models DB 2 by using model IDs that are associated with scene IDs on a one-to-one basis. Furthermore, the chunk-meta IDs uniquely identify chunk-meta values, which are information related to the properties of the equipment 22 and 23.

Note that the information processing device 1 acquires the first image 20 (25), location information, and time information, from a user terminal 11 such as a smartphone, in the use stage, in order to estimate the scene. Note that the location information and time information also identify the location and time related to the first image 20 (25) acquired. Furthermore, the information processing device 1 acquires the second image 30 (35), from the user terminal 11 such as a smartphone, in the use stage, in order to estimate the chunk.

Here, to be more specific, the information related to the first image is the first image 20 (25), the location information, and the time information, and the information related to scene ID is scene IDs. The scene estimation unit 4 estimates the scene using the first trained model DB 1, in which associations between the first image 20 (25), the location information and the time information, and scene IDs, are stored.

Using a scene ID as a search key, the scene estimation unit 4 acquires a scene name from the scene table TB 1, which is a table in which scene IDs and scene names, which are the names of scenes, are linked on a one-to-one basis, and transmits this to the user terminal 11. The user terminal 11 presents the scene name received from the scene estimation unit 4 to the user.

Using the scene ID as a search key, the chunk estimation unit 5 acquires a model ID from the model table TB 2, which is a table in which model IDs and scene IDs are linked on a one-to-one basis. Furthermore, using a chunk-meta ID as a search key, the chunk estimation unit 5 acquires a chunk ID from the chunk/meta table TB 6, which is a table in which chunk IDs and chunk-meta IDs are linked on a one-to-one or one-to-many basis.

Furthermore, using the chunk ID as a search key, the chunk estimation unit 5 acquires a chunk summary, which shows a summary of a chunk, from a chunk table TB 7, and transmits the chunk summary to the user terminal 11. The user terminal 11 presents the chunk summary, received from the chunk estimation unit 5, to the user.

Furthermore, the chunk estimation unit 5, using the chunk ID as a search key, acquires a chunk from the chunk table TB 7, and transmits the chunk to the user terminal 11. The user terminal 11 presents the chunk, received from the chunk estimation unit 5, to the user.

Note that the chunk table TB 7 is a table, in which chunks, chunk summaries, and hash values are linked with chunk IDs on a one-to-one basis. Note that the hash values are used, for example, to check whether or not chunks have been changed.

Next, the information processing device 1 in the learning stage will be described with reference to FIG. 2. For example, in the learning stage, the first image 20 (25) input from an input device (not shown) and one or a plurality of second images 30 (35) are trained as a set. Here, learning refers to, for example, supervised learning.

Figure 2:
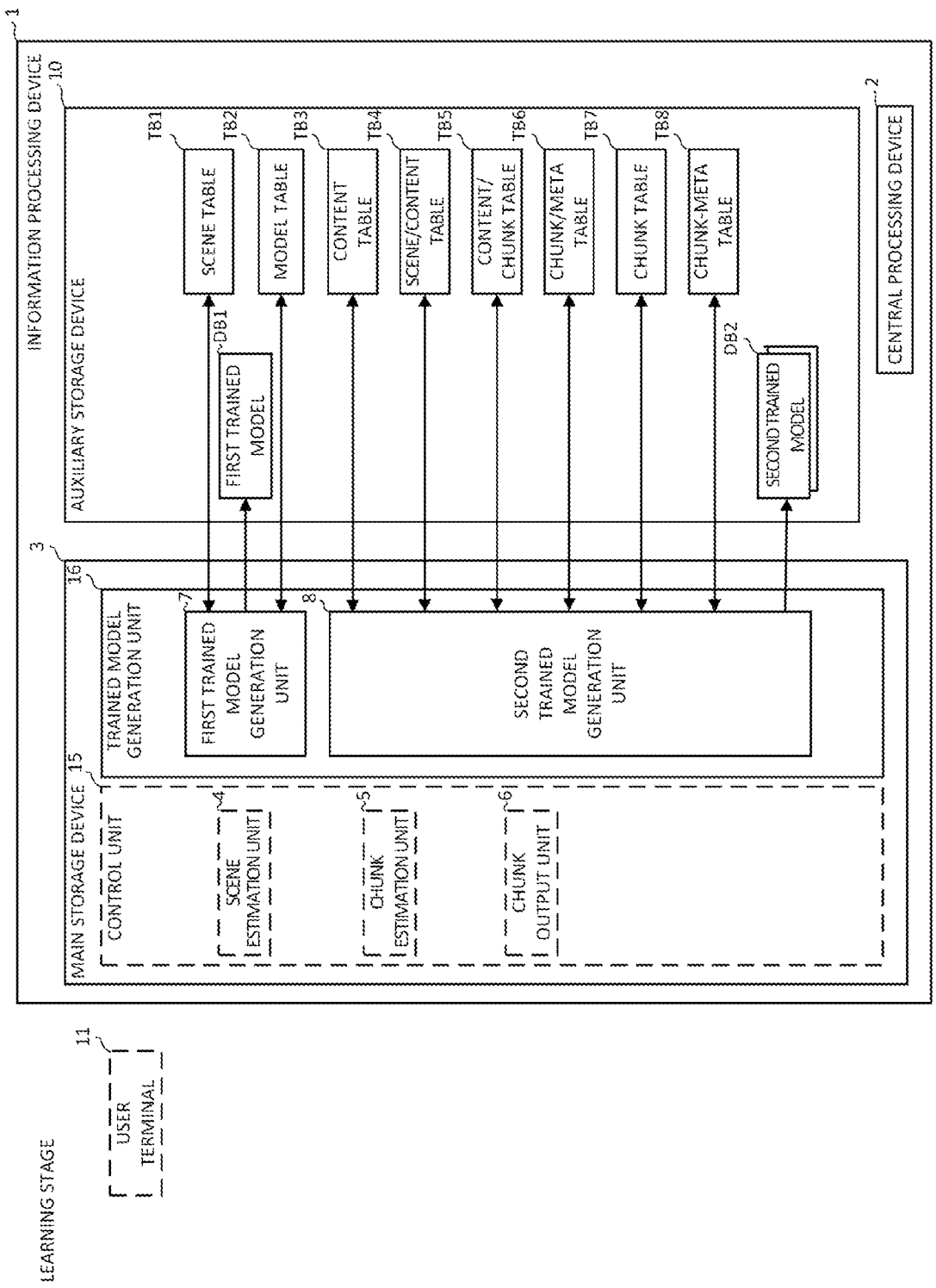
FIG. 2 is a block diagram to show a configuration of the information processing device in the learning stage according to the present embodiment.

FIG. 2 is a block diagram to show a configuration of the information processing device in the learning stage according to the present embodiment. In the learning stage, the information processing device 1 has a first trained model generation unit 7 and a second trained model generation unit 8.

The first trained model generation unit 7 is a program to generate the first trained model DB 1 by having a pair of a scene ID with a first image 20 (25), location information and time information learned in a first training model DB 1'.

The first trained model generation unit 7 acquires the scene ID from the scene table TB 1 with respect to the first image 20 (25), and acquires the model ID corresponding to the scene ID from the model table TB 2.

The second trained model generation unit 8 is a program to generate the second trained model DB 2 by specifying a model ID and having a pair of one or a plurality of chunk-meta IDs with a second image 30 (35) learned in a second training model DB 2'.

The second trained model generation unit 8, using the scene ID as a search key, acquires a content ID from a scene/content table TB 4, which is a table in which scene IDs and content IDs are linked on a one-to-many basis. Note that the scene ID used as the search key here is linked with the first image 20 (25) that is paired with the second image 30 (35) to be processed.

The second trained model generation unit 8, using the content ID as a search key, acquires contents from the content table TB 3, which is a table in which content IDs and contents are linked on a one-to-one basis.

The second trained model generation unit 8, using the content ID as a search key, acquires a chunk ID from the content/chunk table TB 5, which is a table in which content IDs and chunk IDs are linked on a one-to-one or a one-to-many basis.

The second trained model generation unit 8 acquires a chunk from the chunk table TB 7 by using the chunk ID as a search key, and acquires a chunk-meta ID from the chunk/meta table TB 6 by using the chunk ID as a search key.

The second trained model generation unit 8, using the chunk-meta ID as a search key, acquires a chunk-meta value from the chunk-meta table TB 8. The chunk-meta table TB 8 is a table, in which chunk-category IDs, chunk-category names and chunk-meta values are linked with chunk-meta IDs on a one-to-one basis.

The chunk-category IDs uniquely identify chunk-category names, which are the names of categories to which the chunk-meta values belong. Note that the second trained model generation unit 8 references the second image 30 (35) and checks whether there is no problem with the acquired chunk, contents, and chunk-meta value.

Values that are problematic are judged as being abnormal values and not used in supervised learning, so that the second trained model generation unit 8 can generate a highly accurate trained model DB 2, and, in the use stage, the information processing device 1 can perform highly accurate processing.

Figure 3:
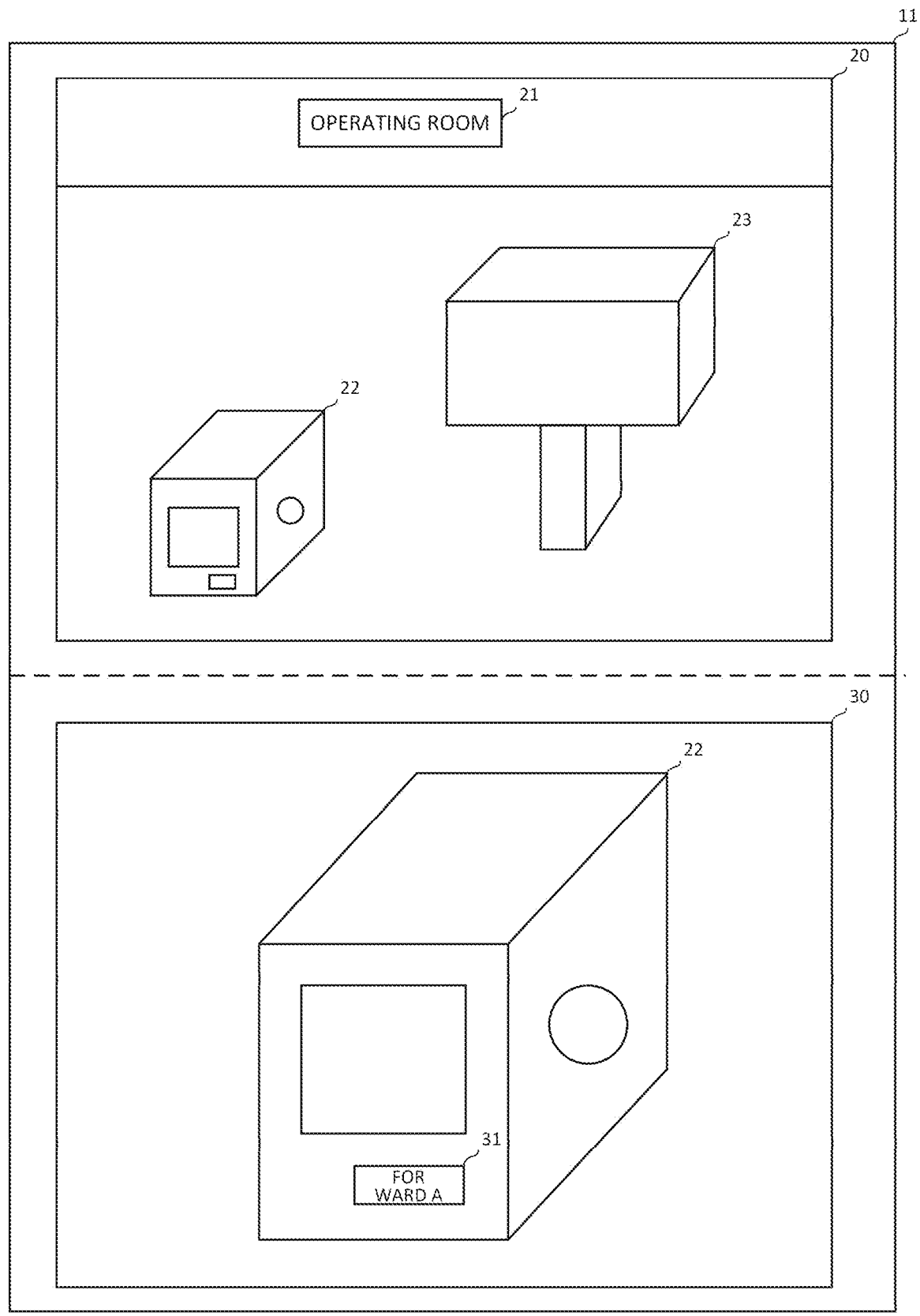
FIG. 3 is a diagram to show the first image and the second image according to the present embodiment.

Next, the first image 20 (25) and the second image 30 (35), which are acquired by the user terminal 11 and which are processed as information by the information processing device 1, will be described with reference to FIG. 3. FIG. 3 is a diagram to show the first image 20 (25) and the second image 30 (35) according to the present embodiment.

The first image 20 (25) and the second image 30 (35) are displayed on the user terminal 11. Although FIG. 3 shows an example, in which the first image 20 (25) and the second image 30 (35) are displayed simultaneously, the first image 20 (25) and the second image 30 (35) may be displayed separately on the user terminal 11.

The equipment 22 and the equipment 23 are captured in the first image 20 (25). A plate 21 that can identify the scene may be captured in the first image 20 (25). One of the equipment 22 and 23 is imaged in the second image 30 (35), and a sticker 31 or the like attached to the equipment 22 (23) is captured clearly.

Figure 4:
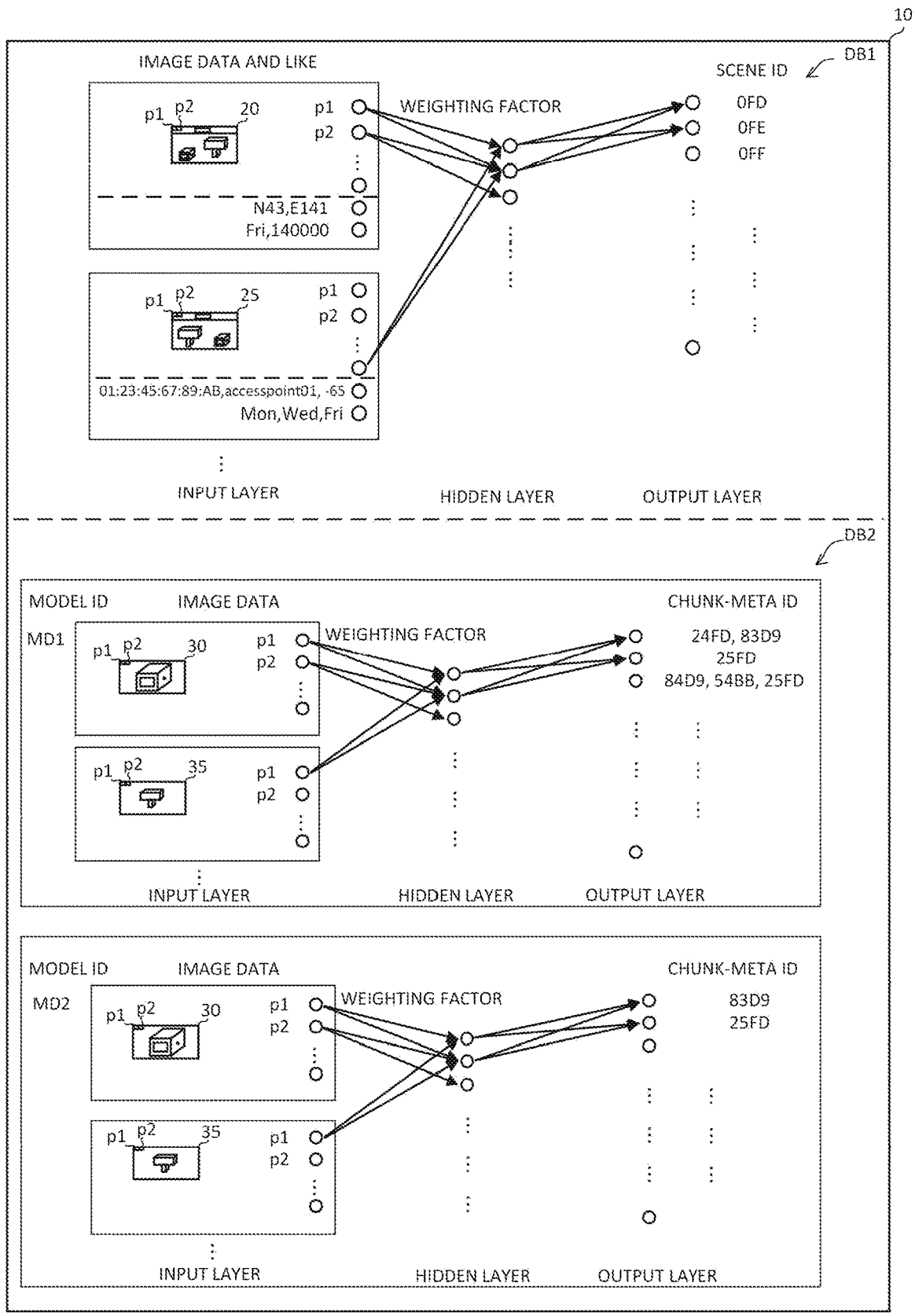
FIG. 4 is a diagram to show the first trained model and the second trained model according to the present embodiment.

Next, the first trained model DB 1 and the second trained model DB 2 will be described with reference to FIG. 4. FIG. 4 shows the first trained model DB 1 and the second trained model DB 2 according to the present embodiment.

In the first trained model DB 1, associations between a plurality of first images 20 (25), location information and time information, and a plurality of scene IDs, generated based on machine learning using a plurality of pairs of training data, where a first image 20 (25), location information and time information, and a scene ID constitute a pair. Here, machine learning is, for example, a convolutional neural network (CNN).

The associations between first images 20 (25), location information and time information, and scene IDs can be represented, to be more specific, by a convolutional neural network, which is represented by nodes represented by circles in FIG. 4, edges represented by arrows, and weighting factors configured for the edges. Note that, as shown in FIG. 4, the first images 20 (25) are input in the first trained model DB 1, for example, per pixel such as pixel p1, pixel p2, and so forth.

For example, the location information is represented by the combination of latitude and longitude such as N43 and E141, the combination of a MAC address, an SSID and a radio field strength, like "01:23:45:67:89:AB, accespoint01, −65". Also, for example, the time information is represented by the combination of the day of the week to perform work and the time to start work, like "Fri, 140000", and a plurality of days of the week to perform work, like "Mon, Wed, Fri".

There are plurality of second trained models DB 2, linked with model IDs on a one-to-one basis. Each second trained model DB 2 stores associations between a plurality of second images 30 (35) and one or a plurality of chunk-meta IDs, generated based on machine learning using a plurality of pairs of training data, where a second image 30 (35) and one or a plurality of chunk-meta IDs constitute a pair. Here, machine learning is, for example, a convolutional neural network (CNN).

The associations between a plurality of second images 30 (35) and one or a plurality of chunk-meta IDs can be represented, to be more specific, by a convolutional neural network, which is represented by nodes represented by circles in FIG. 4, edges represented by arrows, and weighting factors configured for the edges. Note that, as shown in FIG. 4, the second images 30 (35) are input in the second trained model DB 2, for example, per pixel such as pixel p1, pixel p2, and so forth.

Next, the information stored in the auxiliary storage device 10, namely the scene table TB 1, the model table TB 2, the content table TB 3, the scene/content table TB 4, the content/chunk table TB 5, the chunk/meta table TB 6, the chunk table TB 7, and the chunk-meta table TB 8 will be described with reference to FIG. 5. FIG. 5 is a diagram to show the information stored in the auxiliary storage device 10 according to the present embodiment.

The scene IDs stored in the scene table TB 1 and/or elsewhere are each represented by, for example, a three-digit hexadecimal number, like "OFD". Also, the scene names stored in the scene table TB 1 and/or elsewhere are, for example, "operating room", "treatment room", and so forth, and are the names described in the plate 21, for example.

The model IDs stored in the model table TB 2 and/or elsewhere are each represented by, for example, two letters of the alphabet and a one-digit decimal number, like "MD1." The content IDs stored in the content table TB 3 and/or elsewhere are each represented by, for example, a five-digit hexadecimal number and a two-digit decimal number, like "1B827-01". The contents stored in the content table TB 3 and/or elsewhere are each specified with an extension, and file name is the content ID, like "1B827-01.txt", and a pointer to the body of the contents is stored.

The chunk IDs stored in the content/chunk table TB 5 and/or elsewhere are each represented by, for example, five-digit and two-digit decimal numbers, like "82700-01". The chunk-meta IDs stored in the chunk/meta table TB 6 and/or elsewhere are each represented by, for example, a four-digit hexadecimal number, like "24FD".

The chunks stored in the chunk table TB 7 are each represented by, for example, the file name of the contents corresponding to the chunk in question, and a one-digit decimal number, like "1B827-01. txt_0", and a pointer to a part of the body of the contents corresponding to the chunk in question is stored.

The chunk summaries stored in the chunk table TB 7 are each a document summarizing the contents of a chunk, and show, for example, "due to deterioration over time . . . ". The hash values stored in the chunk table TB 7 are each represented by, for example, a fifteen-digit hexadecimal number, like "564544d8f0b746e".

The chunk-category IDs stored in the chunk-meta table TB 8 are each represented by, for example, a three-digit decimal number, like "394". The chunk-category names stored in the chunk-meta table TB 8 are each, for example, weight, color, shape, and so forth. The chunk-meta values stored in the chunk-meta table TB 8 are each, for example, light, heavy, white, blue, and so forth. Note that the values of chunk-category IDs and chunk-category names may be NULL.

As shown by the scene/content table TB 4, content/chunk table TB 5 and chunk/meta table TB 6, the data structure of work information, which is information related to the work performed by the user in the place for work, has a hierarchical structure, in which the chunk-meta ID is the first layer, which is the lowest layer, the chunk ID is the second layer, the content ID is the third layer, and the scene ID is the fourth layer, which is the highest layer.

Figure 6:
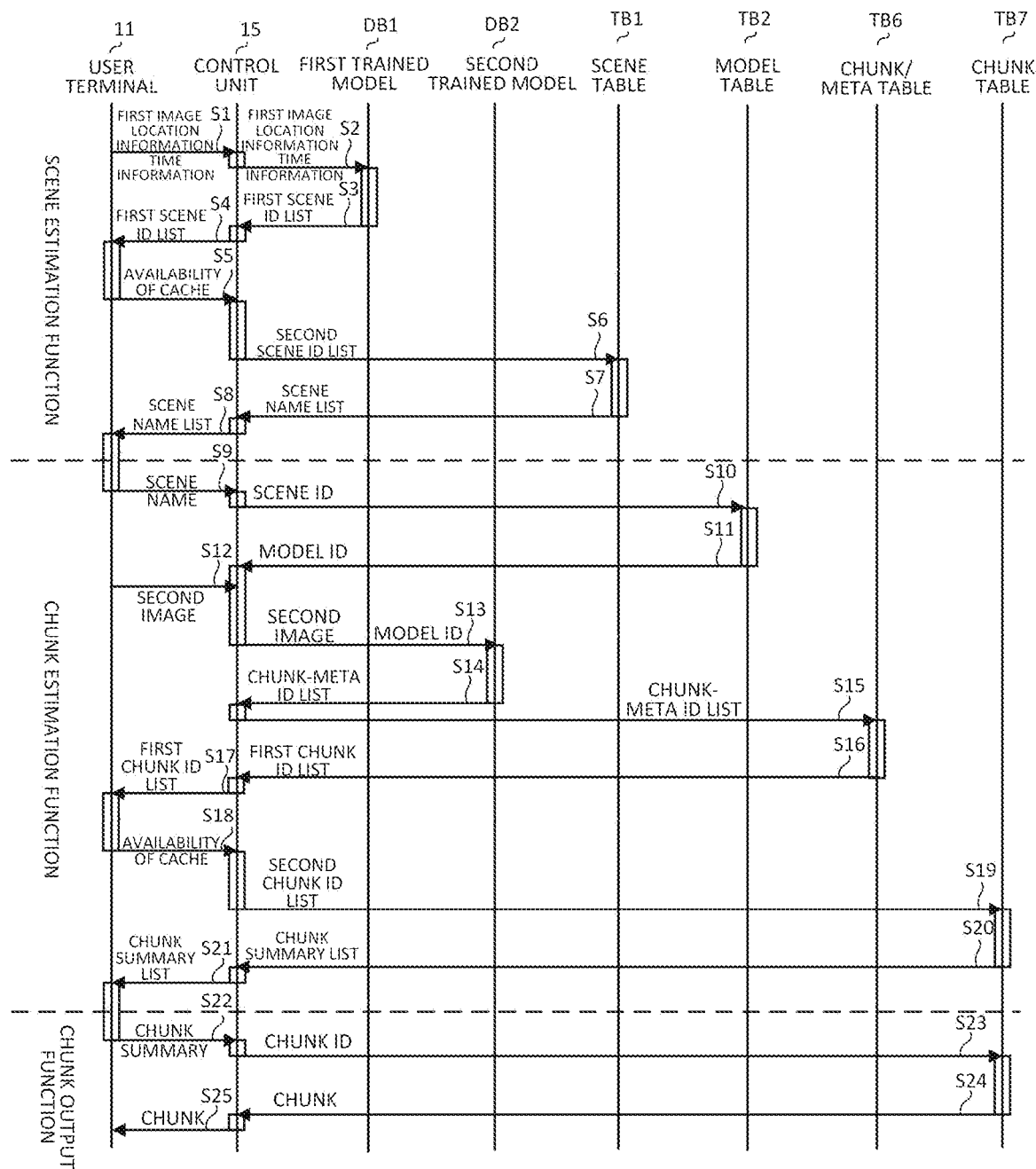
FIG. 6 is a sequence diagram for use for describing the scene estimation function, chunk estimation function, and chunk output function according to the present embodiment.

Next, the scene estimation function, chunk estimation function, and chunk output function will be described with reference to FIG. 6. FIG. 6 is a sequence diagram for use for describing the scene estimation function, chunk estimation function, and chunk output function according to the present embodiment.

The information processing functions in the use stage are comprised of a scene estimation function, realized by the scene estimation process S60 (described later), a chunk estimation function, realized by the chunk estimation process S80 (described later), and a chunk output function, realized by the chunk output process S100 (described later).

First, the scene estimation function will be described. When the scene estimation unit 4 included in the control unit 15 receives the first image 20 (25), location information and time information from the user terminal 11 (S1), the scene estimation unit 4 inputs the first image 20 (25), location information and time information in the first trained model DB 1 (S2).

The first trained model DB 1 selects one or a plurality of scene IDs that are strongly linked with the received first image 20 (25), location information and time information, and outputs the one or plurality of scene IDs (hereinafter these may be referred to as the "first scene ID list") selected, to the scene estimation unit 4 (S3).

When the scene estimation unit 4 acquires the first scene ID list, the scene estimation unit 4 transmits it to the user terminal 11 on an as-is basis (S4). The user terminal 11 transmits the availability of a cache, to the scene estimation unit 4, for each scene ID included in the first scene ID list (S5).

The user terminal 11 holds a table equivalent to the scene table TB 1, with respect to the information processed in the past. The user terminal 11, using the scene IDs in the received first scene ID list as search keys, searches the table held by the user terminal 11. The scene IDs, for which search results are found, are cached, and the scene IDs, for which no search results are found, are not cached.

The scene estimation unit 4, using one or a plurality of scene IDs that are not cached in the user terminal 11, among the scene IDs included in the first scene ID list received from the user terminal 11 (and that may be hereinafter referred to as a "second scene ID list"), as search keys, searches the table TB 1 (S6).

The scene estimation unit 4 acquires the scene names that correspond respectively to the scene IDs included in the second scene ID list (and that hereinafter may be referred to as a "scene name list"), as a result of the search, from the scene table TB 1 (S7).

The scene estimation unit 4 transmits the acquired scene name list to the user terminal 11, on an as-is basis (S8). In the use stage, the information processing device 1 realizes the scene estimation function for estimating the scene of the first image 20 (25), acquired by the user terminal 11, by estimating the scene name, in steps S1 to S8.

Next, the chunk estimation function will be described. The user terminal 11 presents the received scene name list to the user. The user selects, for example, one scene name from the presented scene name list. The user terminal 11 transmits the scene name selected by the user, to the chunk estimation unit 5 included in the control unit 15 (S9).

The chunk estimation unit 5, using the scene ID corresponding to the scene name received from the user terminal 11 as a search key (S10), searches the model table TB 2, and acquires a model ID (S11).

The chunk estimation unit 5 receives the second image 30 (35) from the user terminal 11 (S12). The chunk estimation unit 5 designates one of the plurality of second trained models DB 2 based on the model ID acquired from the model table TB 2, and inputs the second image 30 (35) to the designated second trained model DB 2 (S13).

The second trained model DB 2 selects one or a plurality of chunk-meta IDs that are strongly linked with the received second image 30 (35), and outputs the one or plurality of chunk-meta IDs that are selected (and that hereinafter may be referred to as a "chunk-meta ID list"), to the chunk estimation unit 5 (S14).

The chunk estimation unit 5 searches the chunk/meta table TB 6 by using each one or a plurality of chunk-meta IDs included in the chunk-meta ID list as a search key (S15).

The chunk estimation unit 5 acquires one or a plurality of chunk IDs (which hereinafter may be referred to as the "first chunk ID list"), as a result of the search, from the chunk/meta table TB 6 (S16). The chunk estimation unit 5 transmits the acquired first chunk ID list to the user terminal 11 on an as-is basis (S17).

The user terminal 11 transmits the availability of a cache, to the chunk estimation unit 5, for each chunk ID included in the first chunk ID list (S18). The user terminal 11 has a table with the chunk ID column and the chunk summary column of the chunk table TB 7, with respect to the information processed in the past.

The user terminal 11, using the chunk IDs in the received first chunk ID list as search keys, searches the table held by the user terminal 11. The chunk IDs for which search results are found are cached, and the chunk IDs for which no search results are found are not cached.

The chunk estimation unit 5, using one or a plurality of chunk IDs that are not cached in the user terminal 11, among the chunk IDs included in the first chunk ID list received from the user terminal 11 (and that hereinafter may be referred to as a "second chunk ID list"), as search keys, searches the table TB 7 (S19).

The chunk estimation unit 5 acquires chunk summaries that correspond respectively to the chunk IDs included in the second chunk ID list (and that hereinafter may be referred to as a "chunk summary list"), as a result of the search, from the chunk table TB 7 (S20). The chunk estimation unit 5 transmits the acquired chunk summary list to the user terminal 11 on an as-is basis (S21).

In the use stage, the information processing device 1 realizes the chunk estimation function of estimating the chunk of the second image 30 (35), acquired by the user terminal 11, by estimating a chunk summary, in steps S9 to S21.

Next, the chunk output function will be described. The user terminal 11 presents the received chunk summary list to the user. The user selects, for example, one chunk summary out of the chunk summary list presented. The user terminal 11 transmits the selected chunk summary selected by the user, to the chunk output unit 6 included in the control unit 15 (S22).

The chunk output unit 6, using the chunk ID corresponding to the chunk summary received from the user terminal 11 as a search key (S23), searches the chunk table TB 7, and acquires a chunk (S24).

The chunk output unit 6 transmits the acquired chunk to the user terminal 11 on an as-is basis (S25). The user terminal 11 presents the received chunk to the user. In the use stage, the information processing device 1 realizes the chunk output function for outputting the chunk of the second image 30 (35), acquired by the user terminal 11, in steps S22 to S25.

Figure 7:
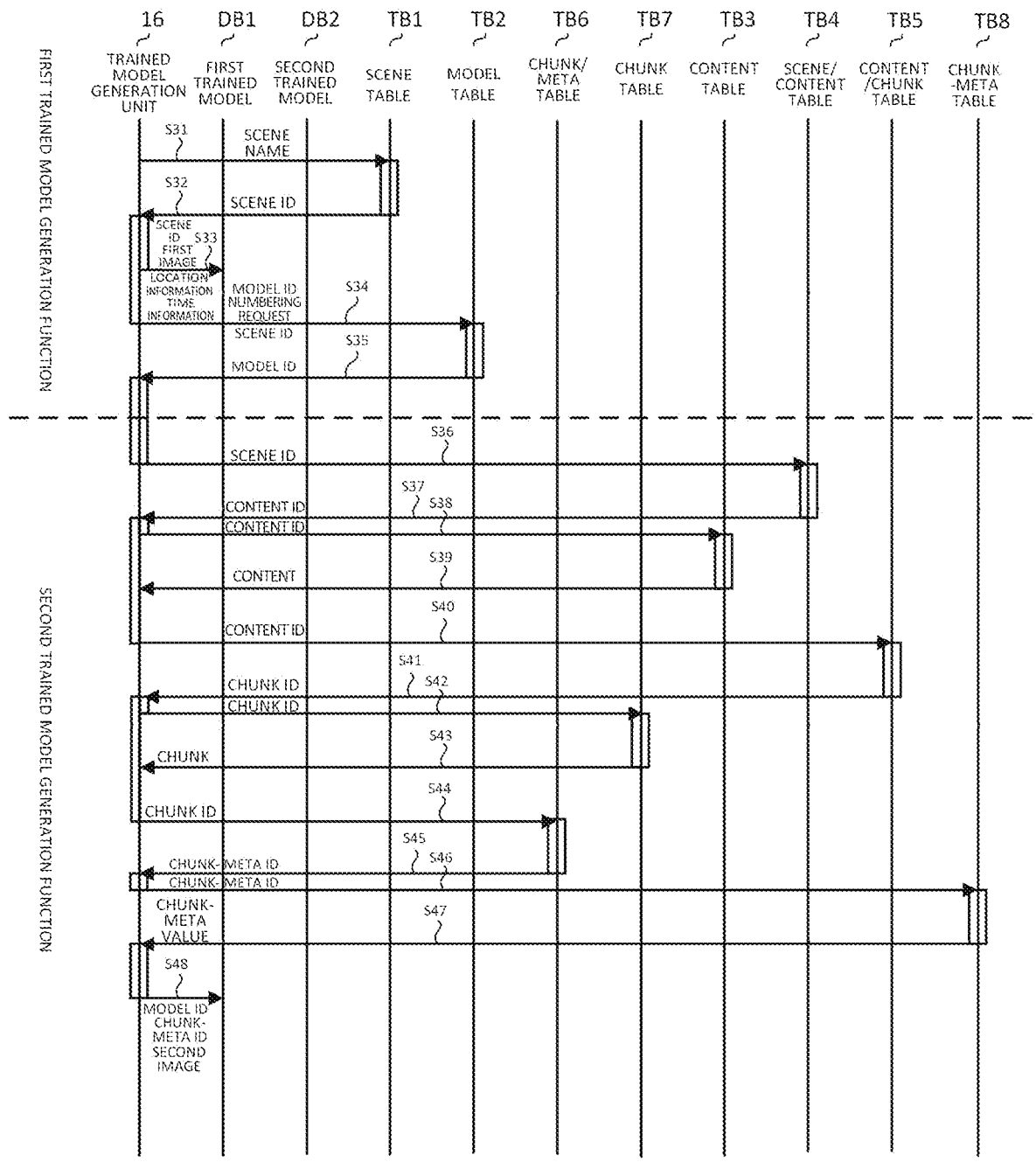
FIG. 7 is a sequence diagram for use for describing the first trained model generation function and the second trained model generation function according to the present embodiment.

Next, the first trained model generation function and the second trained model generation function will be described with reference to FIG. 7. FIG. 7 is a sequence diagram for use for describing the first trained model generation function and the second trained model generation function according to the present embodiment.

The information processing function in the learning stage is comprised of the first trained model generation function, which is realized by the first trained model generation process, and the second trained model generation function, which is realized by the second trained model generation process.

First, the first trained model generation function will be described. The first trained model generation unit 7 included in the trained model generation unit 16 designates the processing-target set of a scene name, a first image 20 (25), location information and time information, and a second image 30 (35), and, using the scene name as a search key, searches the table TB 1 generated in advance (S31).

The first trained model generation unit 7 acquires a scene ID from the scene table TB 1 as a result of the search (S32), and has a pair of the first image 20 (25), location information and time information, and the scene ID, learned in the first training model DB 1' (S33).

Furthermore, the first trained model generation unit 7 requests the acquisition of a model ID, by transmitting the acquired scene ID to the model table TB 2 (S34). The model table TB 2 generates a model ID corresponding to the received scene ID, and stores the combination of the scene ID and the model ID. Next, the first trained model generation unit 7 acquires the model ID from the model table TB 2 (S35). In the learning stage, the information processing device 1 realizes the first trained model generation function of generating the first trained model DB 1 in steps S31 to S35.

Next, the second trained model generation function will be described. The second trained model generation unit 8 included in the trained model generation unit 16, using the scene ID received in the first trained model generation unit 7 in step S32, as a search key, searches the scene/content table TB 4 generated in advance (S36).

The second trained model generation unit 8 acquires a content ID from the scene/content table TB 4, as a result of the search (S37), and, using the acquired content ID as a search key, searches the content table TB 3 that is generated in advance (S38).

The second trained model generation unit 8 acquires contents from the content table TB 3 as a result of the search (S39), and, using the content ID acquired in step S37 as a search key, searches the content/chunk table TB 5 that is generated in advance (S40).

The second trained model generation unit 8 acquires a chunk ID from the content/chunk table TB 5, as a result of the search (S41), and, using the acquired chunk ID as a search key, searches the chunk table TB 7 that is generated in advance. (S42).

The second trained model generation unit 8 acquires a chunk from the chunk table TB 7 as a result of the search (S43), and, using the chunk ID acquired in step S41 as a search key, searches the chunk/meta table TB 6 that is generated in advance (S44).

The second trained model generation unit 8 acquires one or a plurality of chunk-meta IDs from the chunk/meta table TB 6, as a result of the search (S45), and, using each acquired chunk-meta ID as a search key, searches the chunk-meta table TB 8 that is generated in advance (S46).

The second trained model generation unit 8 acquires chunk-meta values, corresponding respectively to the chunk-meta IDs, from the chunk-meta table TB 8, as a result of the search (S47). The second trained model generation unit 8 checks whether there are no problems with the contents acquired in step S39, the chunk acquired in step S43, and the chunk-meta values acquired in step S47, with reference to the first image 20 (25) and the second image 30 (35).

For example, the second trained model generation unit 8 checks this with reference to, for example, the plate 21 captured in the first image 20 (25) and the sticker 31 captured in the second image 30 (35).

If, with reference to these, there is a problem—for example, it is clear that the contents, chunk, and meta-values represent information related to equipment that is clearly different from the equipment captured in the first image 20 (25) and the second image 30 (35)—the processing for the target set ends.

Next, the second trained model generation unit 8 has a set of the model ID, the second image 30 (35) and one or a plurality of chunk-meta IDs learned in the second training model DB 2' (S48). In the learning stage, the information processing device 1 realizes the second trained model generation function for generating the second trained model DB 2, in steps S36 to S48.

Figure 8:
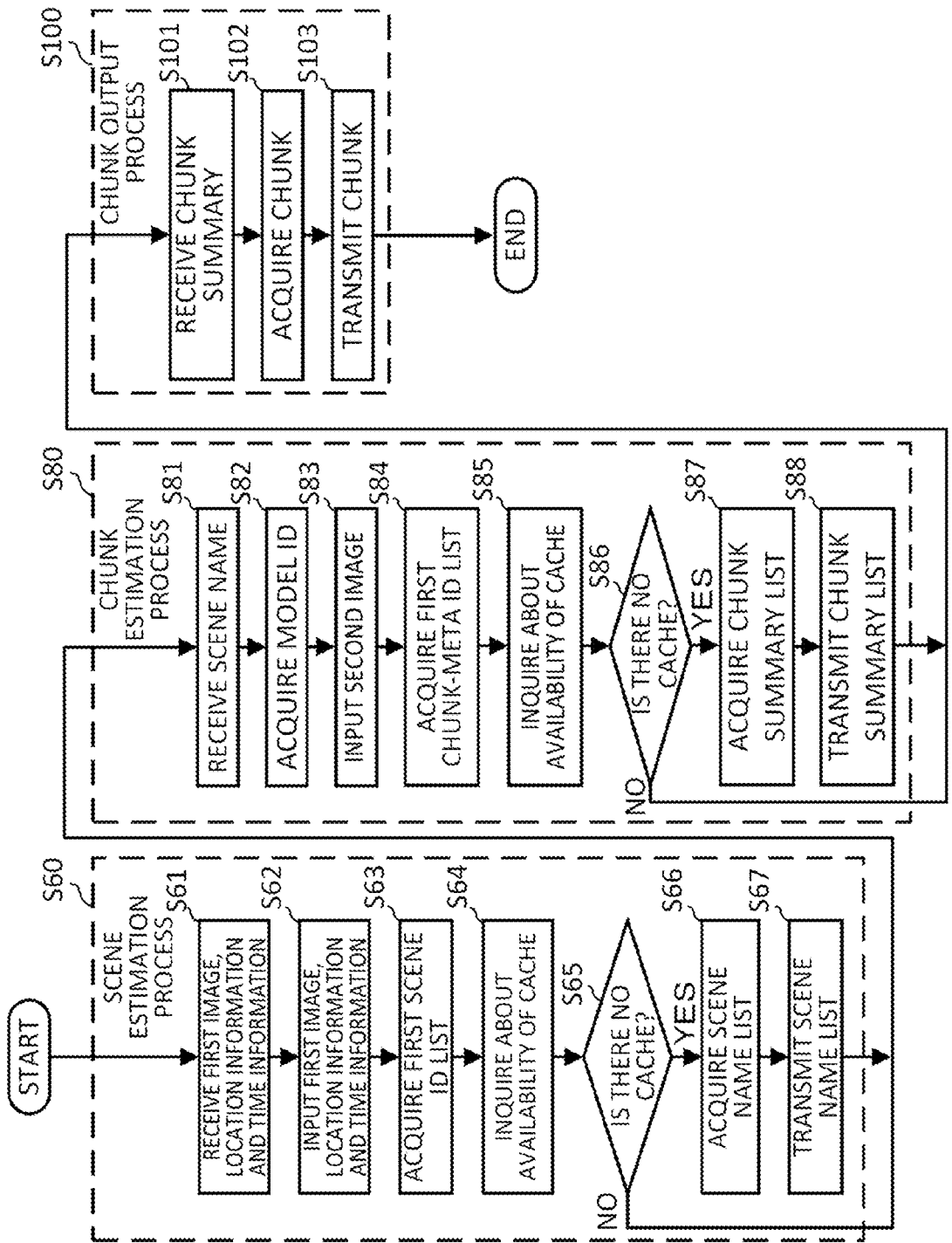
FIG. 8 is a flowchart to show the processing procedures of the information processing in the use stage according to the present embodiment.

Next, the information processing in the use stage will be described with reference to FIG. 8. FIG. 8 is a flowchart to show the processing procedures of the information processing in the use stage according to the present embodiment. The information processing in the use stage is comprised of a scene estimation process S60, a chunk estimation process S80, and a chunk output process S100.

First, the scene estimation process S60 will be described. The scene estimation process S60 is comprised of steps S61 to S67. When the scene estimation unit 4 receives the first image 20 (25), location information and time information from the user terminal 11 (S61), the scene estimation unit 4 inputs the first image 20 (25), location information and time information to the trained model DB 1 (S62).

The scene estimation unit 4 acquires the first scene ID list as an output from the first trained model DB 1 (S63), transmits the first scene ID list to the user terminal 11 on an as-is basis, and inquires with the user terminal 11 about the availability of caches (S64).

When all results returned from the user terminal 11 indicate "there is a cache" (S65: NO), the scene estimation process S60 ends, and the chunk estimation process S80 is started. When even one result to indicate "there is no cache" (S65: YES) is returned from the user terminal 11, the scene estimation unit 4 acquires a scene name list from the scene table TB 1 (S66) and transmits this to the user terminal 11 on an as-is basis (S67), and the scene estimation process S60 ends.

Next, the chunk estimation process S80 will be described. The chunk estimation process S80 is comprised of steps S81 to S88. The chunk estimation unit 5 receives the scene name selected by the user from the user terminal 11 (S81).

When the chunk estimation unit 5 receives the scene name from the user terminal 11, the chunk estimation unit 5 acquires a model ID from the model table TB 2 (S82). When the chunk estimation unit 5 receives the model ID and the second image 30 (35) from the user terminal 11, the chunk estimation unit 5 designates one of a plurality of second trained models DB 2 based on the model ID, and inputs the second image 30 (35) to the designated second trained model DB 2 (S83).

The chunk estimation unit 5 acquires a chunk-meta ID list as an output from the second trained model DB 2 (S84), and acquires the first chunk ID list from the chunk/meta table TB 6 (S85). Next, the chunk estimation unit 5 transmits the first chunk ID list to the user terminal 11 on an as-is basis, and inquires with the user terminal 11 about the availability of caches (S86).

When all results returned from the user terminal 11 indicate "there is a cache" (S86: NO), the chunk estimation process S80 ends, and the chunk output process S100 is started. When even one result to indicate "there is no cache" (S86: YES) is returned from the user terminal 11, the chunk estimation unit 5 acquires a chunk summary list from the chunk table TB 7 (S87) and transmits this to the user terminal 11 on an as-is basis (S88), and the chunk estimation process S80 ends.

Next, the chunk output process S100 will be described. The chunk output process S100 is comprised of steps S101 to S103. The chunk output unit 6 receives the chunk summary selected by the user from the user terminal 11 (S101).

When the chunk output unit 6 receives the chunk summary from the user terminal 11, the chunk output unit 6 acquires a chunk from the chunk table TB 7 (S102) and transmits this to the user terminal 11 on an as-is basis (S103), and the chunk output process S100 ends.

Figure 9:
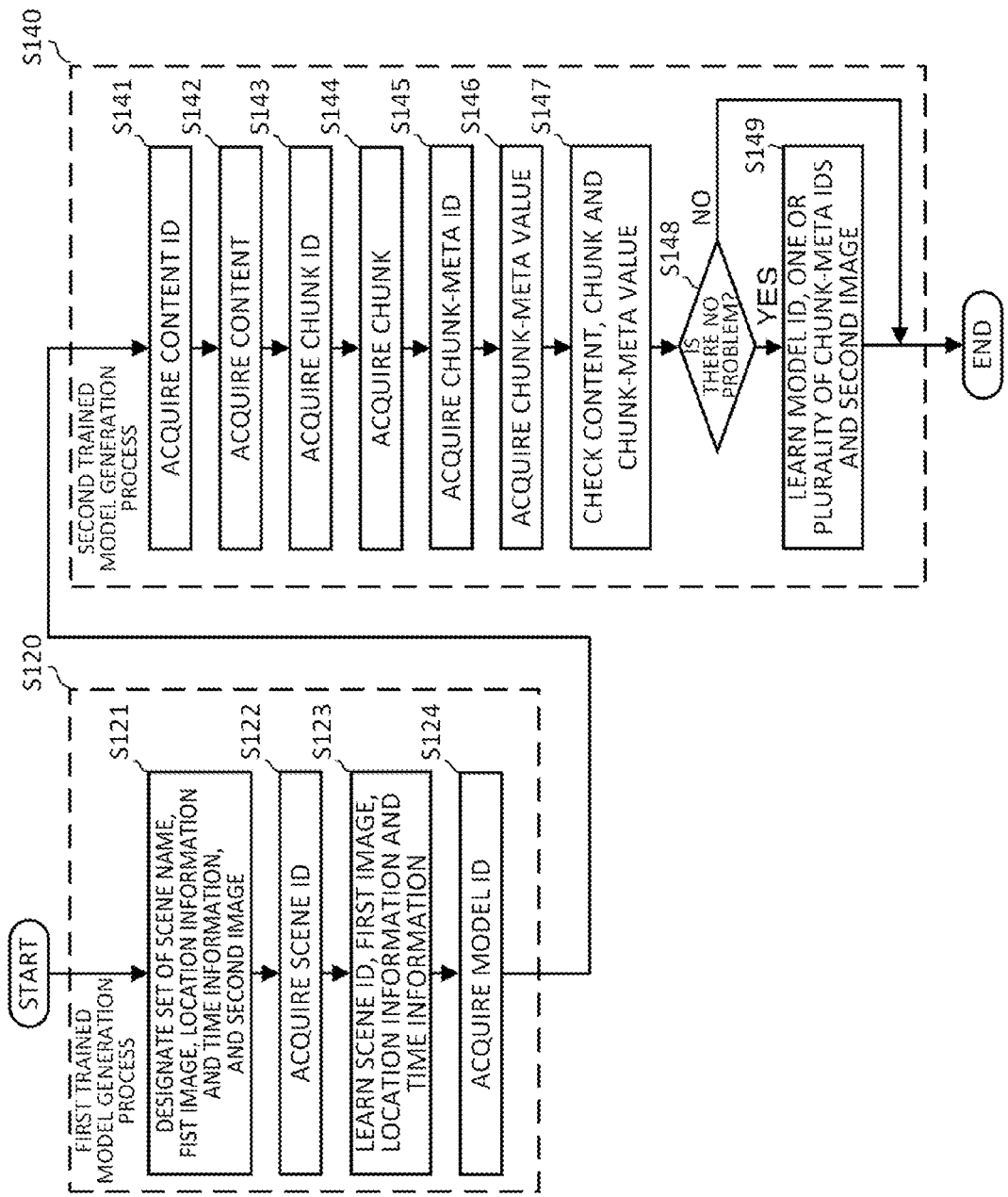
FIG. 9 is a flowchart to show the processing procedures of the information processing in the learning stage according to the present embodiment.

Next, the information processing in the learning stage will be described with reference to FIG. 9. FIG. 9 is a flowchart to show the processing procedures of the information processing in the learning stage according to the present embodiment. The information processing in the learning stage is comprised of a first trained model generation process S120 and a second trained model generation process S140.

First, the first trained model generation process S120 will be described. The first trained model generation process S120 is comprised of steps S121 to S124. The first trained model generation unit 7 designates a set of a scene name, a first image 20 (25), location information and time information, and a second image 30 (35), and then, using the scene name as a search key, searches the scene table TB 1 (S121).

The first trained model generation unit 7 acquires a scene ID from the scene table TB 1 as a result of the search (S122), and has a pair of the first image 20 (25), location information and time information, and the scene ID, learned in the first training model DB 1' (S123).

Next, the first trained model generation unit 7 requests the acquisition of a model ID, by transmitting the scene ID acquired in step S122 to the model table TB 2, and acquires the model ID (S124).

Next, the second trained model generation process S140 will be described. The second trained model generation process S140 is comprised of steps S141 to S149. The second trained model generation unit 8, using the scene ID acquired in step S122 as a search key, searches the scene/content table TB 4, and acquires a content ID (S141).

The second trained model generation unit 8, using the acquired content ID as a search key, searches the content table TB 3, and acquires contents (S142). Furthermore, the second trained model generation unit 8, using the acquired content ID as a search key, searches the content/chunk table TB 5, and acquires a chunk ID (S143).

Furthermore, the second trained model generation unit 8, using the acquired chunk ID as a search key, searches the chunk table TB 7, and acquires a chunk (S144). Furthermore, using the acquired chunk ID as a search key, the second trained model generation unit 8 searches the chunk/meta table TB 6, and acquires one or a plurality of chunk-meta IDs (S145).

Furthermore, using each of the one or plurality of chunk-meta IDs acquired, as a search key, the second trained model generation unit 8 searches the chunk-meta table TB 8, and acquires chunk-meta values corresponding respectively to the chunk-meta IDs (S146).

The second trained model generation unit 8 checks whether there are no problems with the contents acquired in step S142, the chunk acquired in step S144, and the chunk-meta values acquired in step S146, with reference to the first image 20 (25) and the second image 30 (35) (S147).

If there is a problem as a result of the checking (S148: NO), the information processing in the learning stage for the set being processed ends. If there is no problem as a result of the checking (S148: YES), the second trained model generation unit 8 has a set of the model ID, one or a plurality of chunk-meta IDs, and the second image 30 (35) learned in the second training model DB 2' (S149), and the information processing in the learning stage for the set being processed ends.

As described above, chunks that divide or suggest work information are presented by the information processing device 1 according to the present embodiment via the user terminal 11. Consequently, it is possible to present the required amount of information by setting chunks in an appropriate manner. Also, if a chunk serves as information to suggest the whole of a document, there is no need to reconstruct a large amount of information.

Also, by inputting location information and location information as input data, it becomes possible for the user to make a more accurate judgments when needed. Furthermore, by using the model table TB 2, it is possible to cope with case where the relationship between the first trained model DB 1 and the second trained model DB 2 changes, by changing the model table TB 2 alone, so that it is possible to provide a device having excellent maintainability.

Note that, when the model table TB 2 is not used and the relationship between the first trained model DB 1 and the second trained model DB 2 changes, the trained model DB 2 needs to be re-generated.

Although, in the present embodiment, the scene estimation unit 4, chunk estimation unit 5, chunk output unit 6, first trained model generation unit 7 and second trained model generation unit 8 are programs, this is by no means limiting, and they may be logic circuits as well.

Furthermore, the scene estimation unit 4, chunk estimation unit 5, chunk output unit 6, first trained model generation unit 7, second trained model generation unit 8, first trained model DB 1, first training model DB 1', second trained model DB 2, second training model DB 2', scene table TB 1, model table TB 2, content table TB 3, scene/content table TB 4, content/chunk table TB 5, chunk/meta table TB 6, chunk table TB 7 and chunk-meta table TB 8 may not be mounted on one device, and may be mounted on a plurality of devices connected by a network in a distributed manner.

OTHER EMBODIMENTS

Although the user terminal 11 has been a smartphone or the like in the above-described embodiment, the present invention is by no means limited to this, and, for example, a head-mounted display may be used.

Furthermore, although the information related to the first image has been the first image 20 (25), location information and time information, and the information related to scene IDs has been scene IDs in the above-described embodiment, this is by no means limiting.

For example, the information related to the first image may be the first image 20 (25), and the information related to scene IDs may be scene IDs. In this case, the parameters to input in the first training model DB 1' for training in the learning stage are reduced, so that the time required for learning is reduced, and, in addition, the time required to output data from the first trained model DB 1 in the use stage is reduced.

Also, for example, it is possible to use the first image 20 (25) as information related to the first image, and use scene-meta IDs that uniquely identify scene-meta values, which are information related to the properties of the place for work, as information related to scene IDs. Details will be described with reference to FIG. 10 and FIG. 11.

Figure 10:
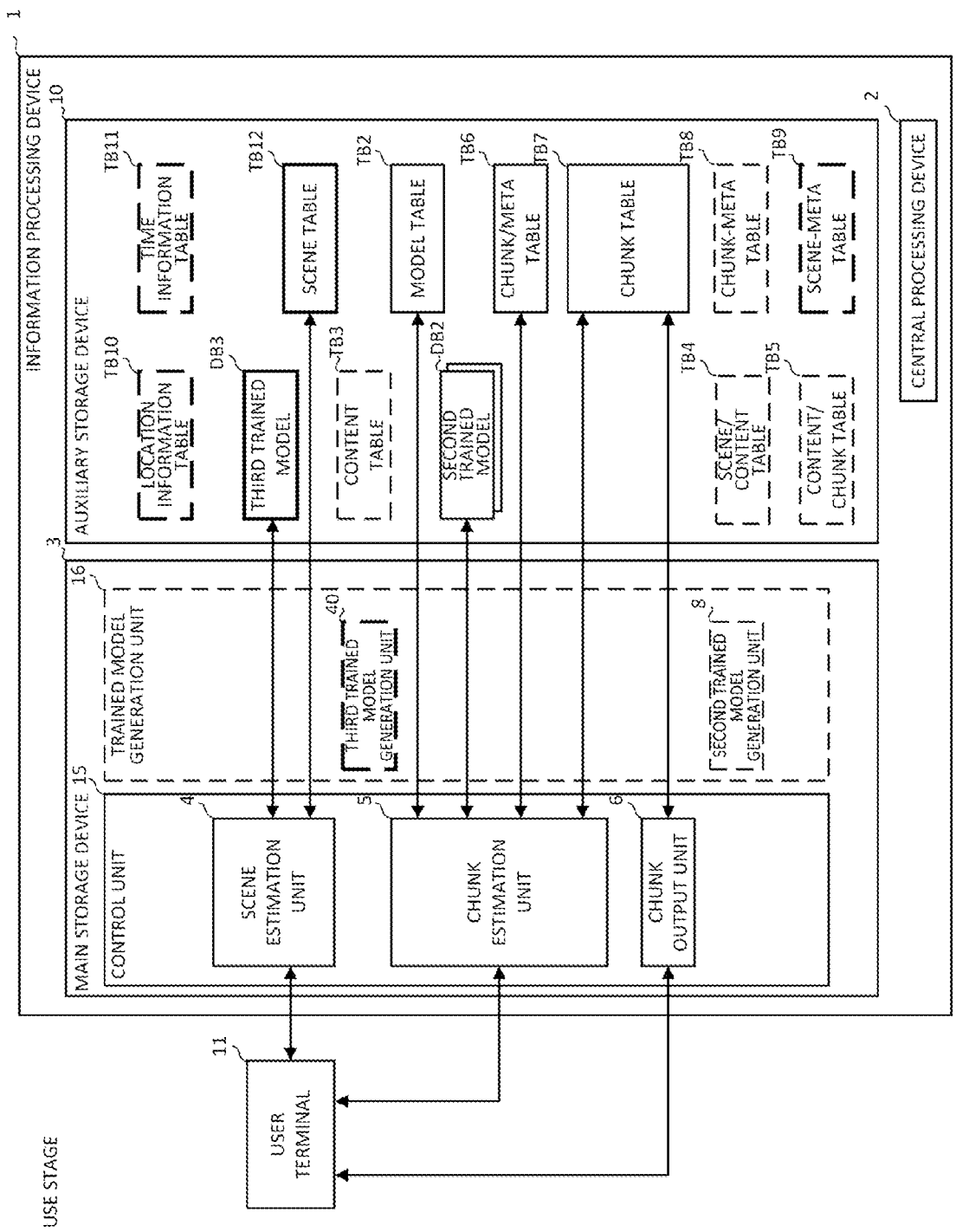
FIG. 10 is a block diagram to show a configuration of the information processing device in the use stage according to another embodiment.
Figure 11:
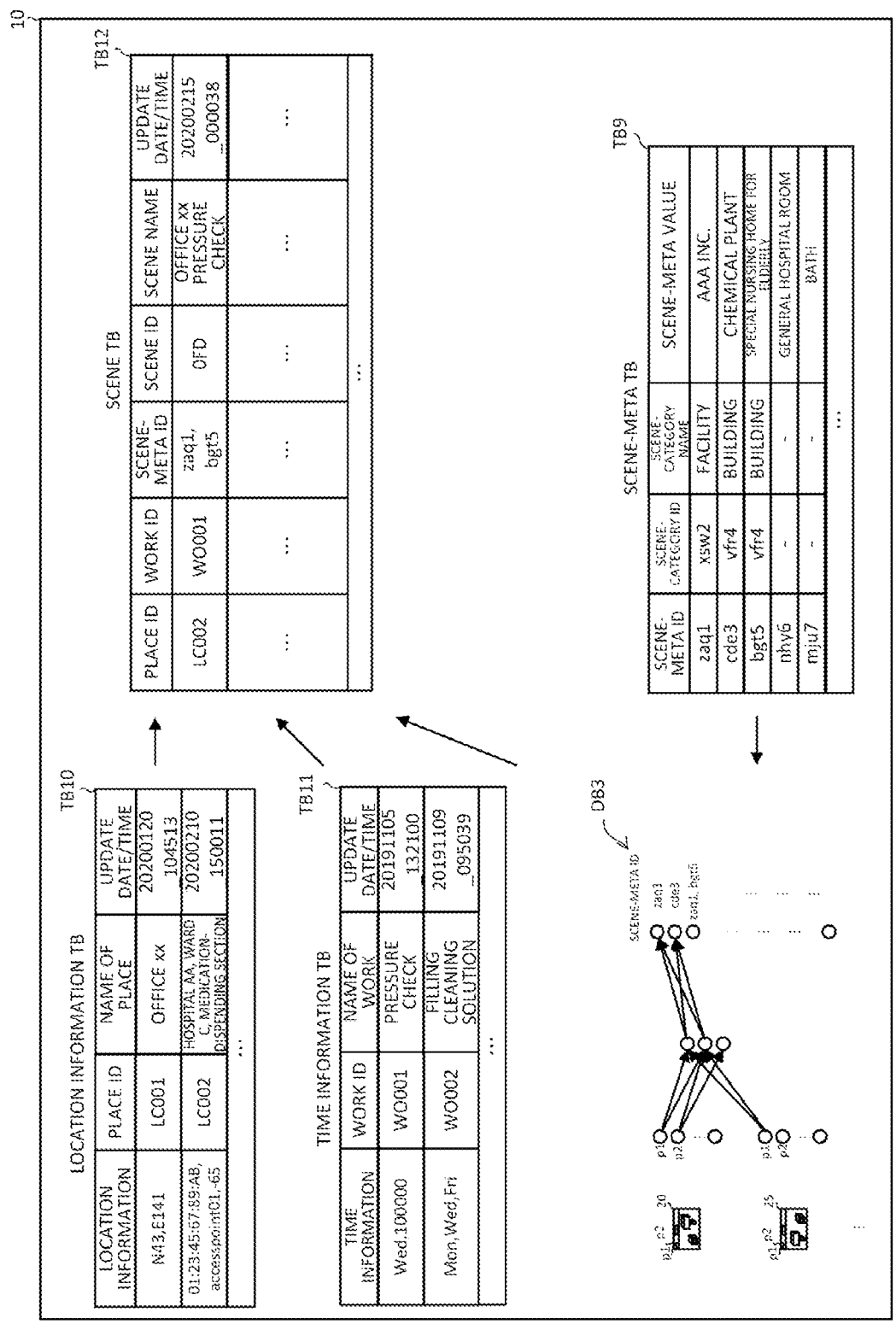
FIG. 11 is a conceptual diagram for use for describing a search for a scene ID in a fuzzy search.

FIG. 10 is a block diagram to show a configuration of the information processing device 1 in the use stage according to another embodiment. FIG. 11 is a conceptual diagram for use for description when searching for a scene ID in a fuzzy search.

As shown in FIG. 10, in another embodiment, the information processing device 1 may have a third trained model generation unit 40, instead of the first trained model generation unit 7. Furthermore, the information processing device 1 may have a third trained model DB 3, instead of the first trained model DB 1.

Furthermore, the information processing device 1 may have a scene table TB 12, instead of the scene table TB 1. Furthermore, a scene-meta table TB 9, a location information table TB 10, and a time information table TB 11 may be further provided.

The third trained model generation unit 40 is a program to generate a trained model DB 3 by having a pair of one or a plurality of scene-meta IDs and a first image 20 (25) learned in a third training model (not shown).

As shown in FIG. 11, the scene-meta table TB 9 is a table, in which scene-meta IDs, scene-category IDs, scene-category names and scene-meta values are linked on a one-to-one basis. The scene-category IDs uniquely identify scene-category names, which are the names of categories to which the scene-meta values belong.

The scene-meta ID stored in the scene-meta table TB 9 or the like are each represented by, for example, three letters of the alphabet and a one-digit decimal number, like "zags". The scene-category names stored in the scene-meta table TB 9 are, for example, "facility", "building", and so forth. The scene-meta values stored in the scene-meta table TB 9 are, for example, "AAA Inc.", "chemical plant", "bath", and so forth. Note that the values of the scene-category IDs and the scene-category names may be "NULL".

As shown in FIG. 11, the location information table TB 10 is a table, in which location information, place IDs that uniquely identify location information, place names, which are the names of places for work, and update date/time, which shows the time some part of the target row in the table was updated, are linked on a one-to-one basis.

The location IDs stored in the location information table TB 10 and/or elsewhere are each represented by, for example, two letters of the alphabet and a three-digit decimal number, like "LC001". The place names stored in the location information table include, for example, "office xx". The update dates/times stored in the location information table and/or elsewhere are each represented by, for example, the year, month, day, time information and so forth, like "2020120104513".

As shown in FIG. 11, the time information table TB 11 is a table in which time information, work IDs that uniquely identify time information, work names, which are the names of work, and update dates/times are linked on a one-to-one basis.

The work IDs stored in the time information table TB 11 and/or elsewhere are each represented by, for example, two letters of the alphabet and a three-digit decimal number, like "WO001". The work names stored in the time information table are, for example, "pressure check".

As shown in FIG. 11, the scene table TB 12 is a table in which place IDs, work IDs, scene-meta IDs, scene IDs, scene names and update dates/times are linked on a one-to-one basis.

As shown in FIG. 11, the third trained model DB 3 stores associations between a plurality of first images 20 (25) and one or a plurality of scene-meta IDs, generated based on machine learning using a plurality of pairs of training data, where a first image 20 (25) and one or a plurality of scene-meta IDs constitute a pair. Here, machine learning is, for example, a convolutional neural network (CNN).

The associations between a plurality of first images 20 (25) and one or a plurality of scene-meta IDs can be represented, to be more specific, by a convolutional neural network, which is represented by nodes represented by circles in FIG. 11, edges represented by arrows, and weighting factors configured for the edges. Note that, as shown in FIG. 11, the first images 20 (25) are input in the third trained model DB 3, for example, per pixel such as pixel p1, pixel p2, and so forth.

The scene estimation unit 4 included in the information processing device 1 as shown in FIG. 10, using the location ID, the work ID and the scene-meta ID as search keys, estimates the scene, in the scene table TB 12, by searching for a scene ID in a fuzzy search.

Note that the location information and time information actually acquired by the user terminal 11 from the user rarely completely match the location information stored in the TB 10 and the time information stored in the TB 11.

For example, assume that the information processing device 1 acquires the information "01:23:45:67:AB, accespoint01, -63, wed, 95552, zat1, bgt5" from the user. The information obtained from the scene table TB 12 is "01:23:45:67:AB, accespoint01, -65, wed, 100,000, zaq1, bgt5".

Even when the information acquired from the user and the information obtained from the scene table TB 12 do not completely match in this way, the information processing device 1 can estimate the scene ID by performing a fuzzy search.

The information processing device 1 shown in FIG. 10 is particularly effective when the database or table is updated infrequently and read out frequently. For example, cases might occur where databases and tables are updated over a long span such as when a system is built, when the work flow is changed, or when a business base is relocated, but the frequency with which they are read is unpredictable and irregular. This is because, even if the information from the user and the information in the database or table are slightly different, the processing can go on by performing a fuzzy search.

Furthermore, with the information processing device 1 shown in FIG. 10, it is not necessary to have location information and time information in the third training model in the learning stage. Consequently, with the information processing device 1 shown in FIG. 10, it is necessary to learn training models per event, such as when only the time the worker performs work is frequently changed, when there are a plurality of buildings having the same appearance, and so forth.

Furthermore, although cases have been described with the learning stages shown in FIG. 7 and FIG. 9 described above where the first trained model and the second trained model are generated in association with each other, the present invention is by no means limited to this, and the first trained model DB 1 and the second trained model DB 2 may be generated separately.

When the first trained model DB 1 and the second trained model DB 2 are generated separately, for example, when the scene is an existing one and only the contents are added, it is not necessary to learn about the scene.

REFERENCE SIGNS LIST

1: information processing device
2: central processing device
3: main memory
4: scene estimation unit
5: chunk estimation unit
6: chunk output unit
7: first trained model generation unit
8: second trained model generation unit
10: auxiliary storage device
11: user terminal

The invention claimed is:

1. An information processing device to output work information, which is information related to work performed by a user, the information processing device comprising:
a hardware processor that is configured to:
acquire a first image, which is an image of a scene of a workplace where the user performs the work, location information, which is information about a location where the user is, and time information, which is information about a time the user performs the work, and estimate the scene by using a first trained model, in which an association between information related to the first image and information related to a scene ID that uniquely identifies the scene is stored,
wherein the first trained model stores associations between information related to a plurality of first images and information related to a plurality of scene IDs generated based on machine learning using a plurality of pairs of training data, each pair including information related to a first image and information relating to a scene ID,
wherein in estimating the scene:
(i) the hardware processor inputs the acquired first image into the first trained model on a per pixel basis, and further inputs the acquired location information and the acquired time information into the first trained model,
ii) the first trained model selects one or more scene IDs among the plurality of scene IDs, the selected one or more scene IDs forming a first scene ID list, based on a strength of association between the input acquired first image input on a per pixel bas is, the location information, and the time information, and the plurality of scene IDs, and outputs the first scene ID list to the hardware processor, and
(iii) the hardware processor transmits the first scene ID list to a user terminal which returns to the hardware processor an availability of a cache in the user terminal for each of the one or more scene IDs included in the first scene ID list, whereby the hardware processor obtains and presents to the user a second scene ID list comprising scene IDs which are not cached in the user terminal among the scene IDs included in the first scene ID list, the estimated scene being selected by the user from among scenes identified by the one or more scene IDs included in the second scene ID list;

acquire a second image, which is an image of equipment related to the work, and estimate a chunk by using one of a plurality of second trained models, in which associations among (i) the second image, (ii) a chunk ID that uniquely identifies the chunk, and (iii) one or a plurality of chunk-meta IDs that are associated on a one-to-one basis with a chunk ID, are stored, wherein the chunk is information that divides or suggests the work information, wherein the hardware processor is configured to select one of the plurality of second trained models using a model ID associated with the scene ID of the estimated scene, the model ID being selected from a plurality of model IDs associated with a plurality of scene IDs on a one-to-one basis, by using the scene ID of the estimated scene as a search key, wherein the second trained models each store associations between a plurality of second images and one or a plurality of chunk-meta IDs generated based on machine learning using a plurality of pairs of training data, each pair including a second image and one or a plurality of chunk meta-IDs, wherein, in estimating the chunk:
  (i) the hardware processor inputs the acquired second image into the selected second trained model on a per pixel basis,
  (ii) the selected second trained model selects one or more chunk-meta IDs among the plurality of chunk-meta IDs, the selected one or more chunk-meta IDs forming a chunk-meta ID list, based on a strength of association between the input acquired second image input on a per pixel basis and the plurality of chunk-meta IDs, and outputs the chunk-meta ID list to the hardware processor, and
  (iii) the hardware processor acquires one or more chunk IDs, using the one or more chunk-meta IDs included in the chunk-meta ID list as a search key, the one or more chunk IDs forming a first chunk ID list, and transmits the first chunk ID list to the user terminal which returns to the hardware processor an availability of a cache in the user terminal for each of the one or more chunk IDs included in the first chunk ID list, whereby the hardware processor obtains a second chunk ID list comprising chunk IDs which are not cached in the user terminal among the chunk IDs included in the first chunk ID list,
  (iv) the hardware processor acquires, using one or a plurality of chunk IDs among the chunk IDs included in the second chunk ID list as a search key, chunk summaries that correspond respectively to chunk IDs included in the second chunk ID list, the chunk summaries forming a chunk summary list, thereby estimating the chunk summaries to estimate the chunk;
  transmit the chunk summary list to the user terminal and receive, from the user terminal, a chunk summary selected from among the chunk summaries forming the chunk summary list;
  acquire, using a chunk ID corresponding to the chunk summary received from the user terminal as a search key, a chunk corresponding to the chunk ID; and
  output the acquired chunk via an output device, wherein the chunk-meta ID uniquely identifies a chunk-meta value, which is information related to the property of the equipment.

2. The information processing device according to claim 1,
  wherein the information related to the first image is the first image, the location information and the time information, and the information related to the scene ID is a scene ID, and
  wherein the hardware processor estimates the scene by using the first trained model, in which an association between the first image, the location information and the time information, and the scene ID is stored.

3. The information processing device according to claim 1,
  wherein the information related to the first image is the first image, and the information related to the scene ID is a scene-meta ID that uniquely identifies a scene-meta value, which is information related to a property of the workplace,
  wherein the hardware processor estimates the scene by performing a fuzzy search by using a place ID that identifies the location information, a work ID that identifies the time information, and the scene-meta ID, as search keys, and
  wherein the scene-meta ID is estimated by the first trained model, in which the association between the first image and one or a plurality of scene-meta IDs is stored.

4. An information processing method for outputting work information, which is information related to work performed by a user, and which is executed by an information processing device comprising a hardware processor, the information processing method comprising:
  acquiring, by the hardware processor, a first image, which is an image of a scene of a workplace where the user performs the work, location information, which is information about a location where the user is, and time information, which is information about a time the user performs the work, and estimating the scene by using a first trained model, in which an association between information related to the first image and information related to a scene ID that uniquely identifies the scene is stored,
  wherein the first trained model stores associations between information related to a plurality of first images and information related to a plurality of scene IDs generated based on machine learning using a plurality of pairs of training data, each pair including information related to a first image and information relating to a scene ID,
  wherein in estimating the scene:
    (i) the hardware processor inputs the acquired first image into the first trained model on a per pixel basis, and further inputs the acquired location information and the acquired time information into the first trained model,
    (ii) the first trained model selects one or more scene IDs among the plurality of scene IDs, the selected one or more scene IDs forming a first scene ID list, based on a strength of association between the input acquired first image input on a per pixel basis, the location information, and the time information, and the plurality of scene IDs, and outputs the first scene ID list to the hardware processor, and
    (iii) the hardware processor transmits the first scene ID list to a user terminal which returns to the hardware processor an availability of a cache in the user terminal for each of the one or more scene IDs included in the first scene ID list, whereby the hardware processor obtains and presents to the user a second scene ID list comprising scene IDs which are not cached in the user terminal among the scene IDs included in the first scene ID list, the estimated scene being selected by the user from among scenes identified by the one or more scene IDs included in the second scene ID list;

acquiring, by the hardware processor, a second image, which is an image of equipment related to the work, and estimating a chunk by using one of a plurality of second trained models, in which associations among (i) the second image, (ii) a chunk ID that uniquely identifies the chunk, and (iii) one or a plurality of chunk-meta IDs that are associated on a one-to-one basis with a chunk ID, are stored, wherein the chunk is information that divides or suggests the work information, wherein the hardware processor is configured to select one of the plurality of second trained models using a model ID associated with the scene ID of the estimated scene, the model ID being selected from a plurality of model IDs associated with a plurality of scene IDs on a one-to-one basis, by using the scene ID of the estimated scene as a search key, wherein the second trained models each store associations between a plurality of second images and one or a plurality of chunk-meta IDs generated based on machine learning using a plurality of pairs of training data, each pair including a second image and one or a plurality of chunk meta-IDs, wherein, in estimating the chunk:
(i) the hardware processor inputs the acquired second image into the selected second trained model on a per pixel basis,
(ii) the selected second trained model selects one or more chunk-meta IDs among the plurality of chunk-meta IDs, the selected one or more chunk-meta IDs forming a chunk-meta ID list, based on a strength of association between the input acquired second image input on a per pixel basis and the plurality of chunk-meta IDs, and outputs the chunk-meta ID list to the hardware processor, and
(iii) the hardware processor acquires one or more chunk IDs, using the one or more chunk-meta IDs included in the chunk-meta ID list as a search key, the one or more chunk IDs forming a first chunk ID list, and transmits the first chunk ID list to the user terminal which returns to the hardware processor an availability of a cache in the user terminal for each of the one or more chunk IDs included in the first chunk ID list, whereby the hardware processor obtains a second chunk ID list comprising chunk IDs which are not cached in the user terminal among the chunk IDs included in the first chunk ID list,
(iv) the hardware processor acquires, using one or a plurality of chunk IDs among the chunk IDs included in the second chunk ID list as a search key, chunk summaries that correspond respectively to chunk IDs included in the second chunk ID list, the chunk summaries forming a chunk summary list, thereby estimating the chunk summaries to estimate the chunk;

transmitting the chunk summary list to the user terminal and receiving, from the user terminal, a chunk summary selected from among the chunk summaries forming the chunk summary list;

acquiring, using a chunk ID corresponding to the chunk summary received from the user terminal as a search key, a chunk corresponding to the chunk ID; and outputting the acquired chunk via an output device, wherein the chunk-meta ID uniquely identifies a chunk-meta value, which is information related to the property of the equipment.

* * * * *